United States Patent
Na et al.

(10) Patent No.: US 9,952,592 B2
(45) Date of Patent: Apr. 24, 2018

(54) MOBILE TERMINAL AND CONTROLLING METHOD THEREOF

(71) Applicant: LG Electronics Inc., Seoul (KR)

(72) Inventors: Sungchae Na, Seoul (KR); Jungin Kwon, Seoul (KR); Dohwan Ahn, Seoul (KR); Hyohoun No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 14/941,232

(22) Filed: Nov. 13, 2015

(65) Prior Publication Data

US 2016/0139596 A1    May 19, 2016

(30) Foreign Application Priority Data

Nov. 14, 2014  (KR) .................. 10-2014-0158833
Nov. 20, 2014  (KR) .................. 10-2014-0162562

(51) Int. Cl.
*G05D 1/00* (2006.01)
*B64C 39/02* (2006.01)
*G08C 17/02* (2006.01)

(52) U.S. Cl.
CPC ......... *G05D 1/0022* (2013.01); *B64C 39/024* (2013.01); *G05D 1/0016* (2013.01); *G05D 1/0038* (2013.01); *G08C 17/02* (2013.01); *B64C 2201/123* (2013.01); *B64C 2201/146* (2013.01)

(58) Field of Classification Search
CPC ..... G05D 1/0022; B64C 39/024; G08C 17/02
See application file for complete search history.

(56) References Cited

U.S. PATENT DOCUMENTS

| | | | |
|---|---|---|---|
| 2010/0228406 A1 | 9/2010 | Hamke et al. | |
| 2011/0288696 A1 | 11/2011 | Lefebure | |
| 2014/0277854 A1 | 9/2014 | Jones et al. | |
| 2014/0316614 A1* | 10/2014 | Newman | G06Q 30/0611 701/3 |
| 2015/0142211 A1* | 5/2015 | Shehata | H04N 7/181 701/2 |

FOREIGN PATENT DOCUMENTS

| | | |
|---|---|---|
| JP | 2000-341672 A | 12/2000 |
| JP | 2012-509812 A | 4/2012 |
| WO | WO 2013/163746 A1 | 11/2013 |

* cited by examiner

*Primary Examiner* — Basil T. Jos
(74) *Attorney, Agent, or Firm* — Birch, Stewart, Kolasch & Birch, LLP

(57) ABSTRACT

A mobile terminal including a display unit; a wireless communication unit configured to wirelessly communicate with a flying object; and a controller configured to receive an input for setting at least one member of a created group of members to be a target, and remotely control the flying object to obtain an image of the at least one member set as the target.

19 Claims, 38 Drawing Sheets

FIG. 11
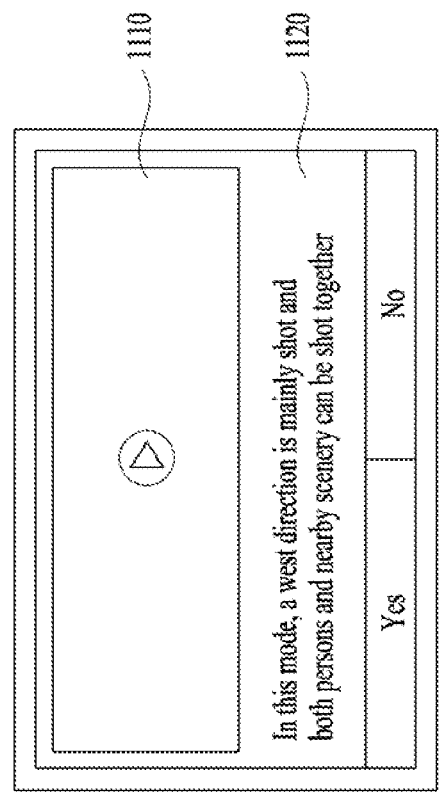
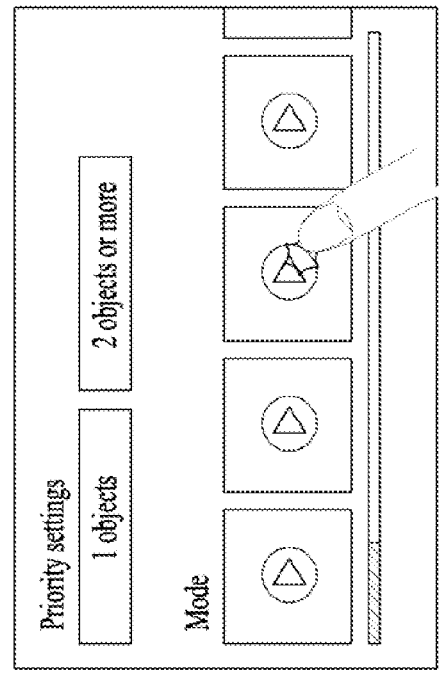

FIG. 13
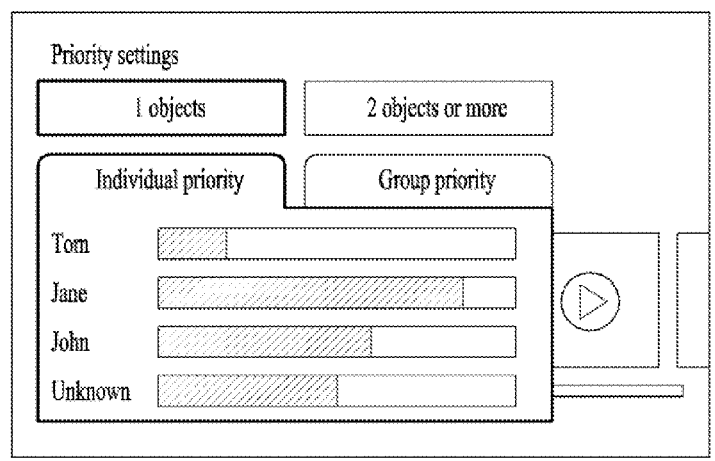
(a)
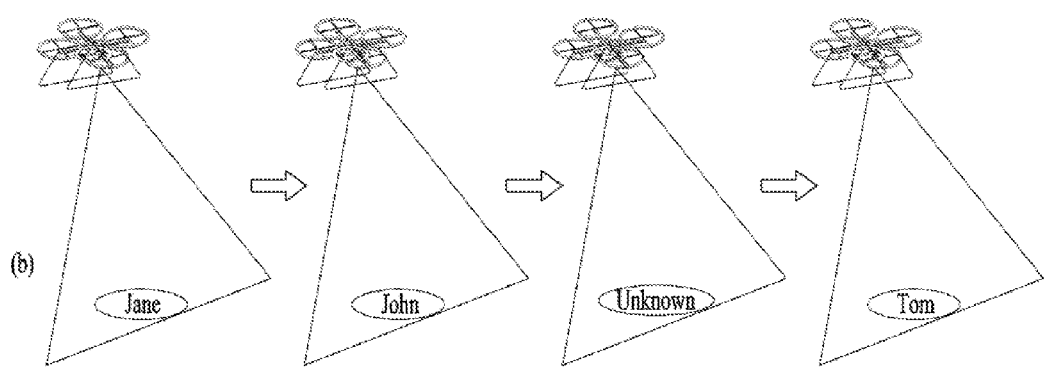
(b)

FIG. 14
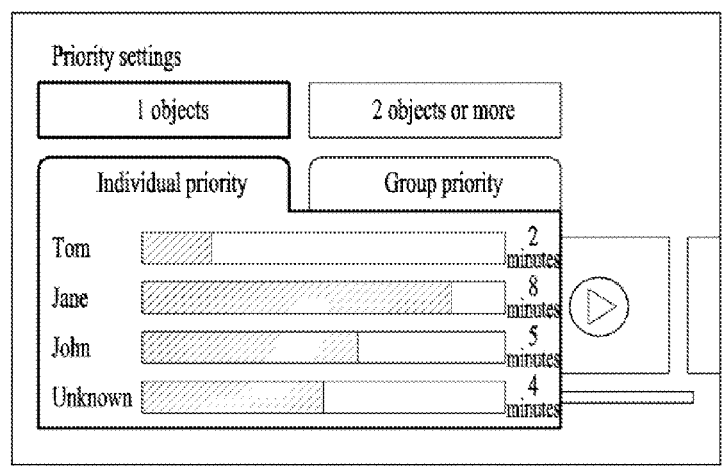
(a)
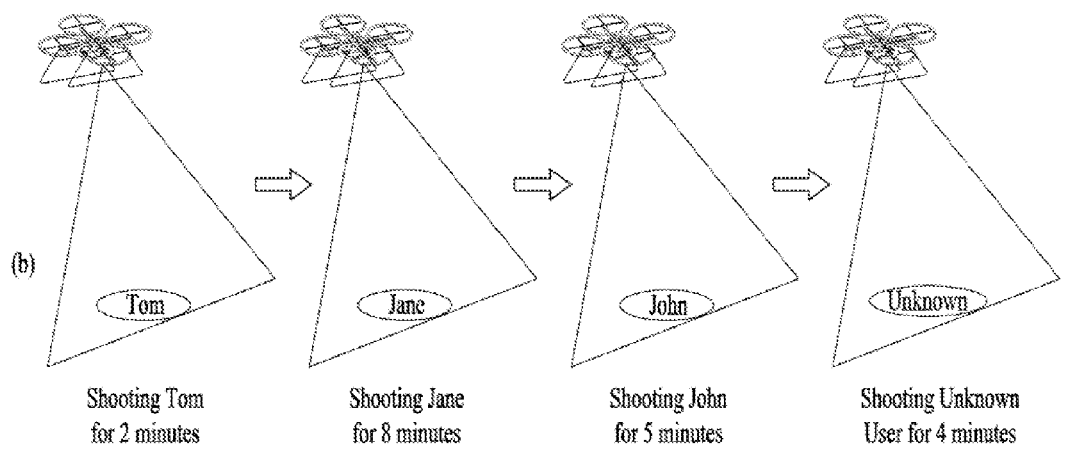
(b)

FIG. 15
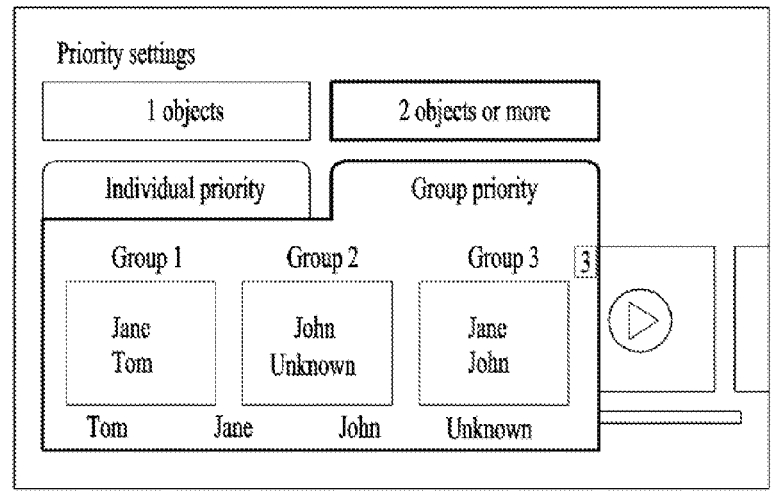
(a)
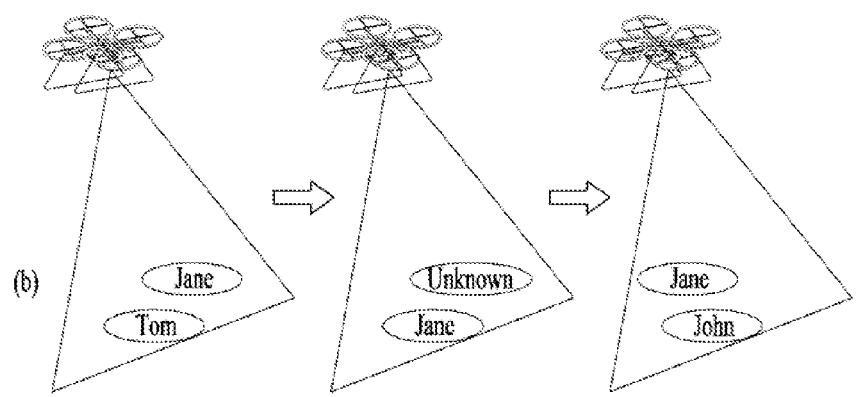
(b)

Select image-making materials

- ☐ Tom     ☐ Moving    ☐ Group 3
- ☐ Jane    ☐ Scenery   ☒ All
- ☐ John    ☐ Group 1
- ☐ Unknown ☐ Group 2

| Yes | No |

(b)

△

Image created from combining Tom, image on moving, scenery, and all shot image together

| Save | Share |

FIG. 23
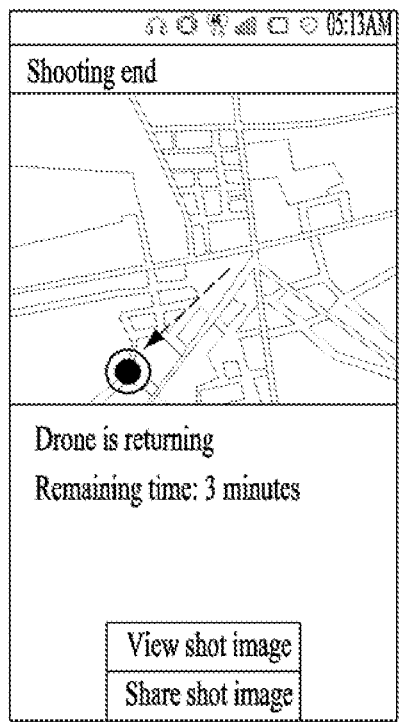
(a)
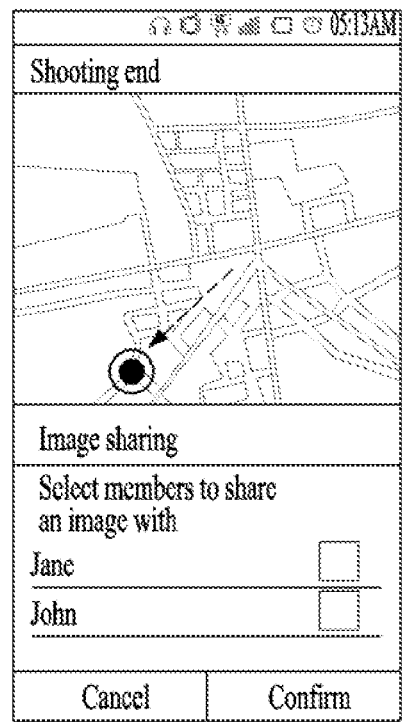
(b)

FIG. 24

| Product ordering step | Product delivering step | | | | Delivery completed |
|---|---|---|---|---|---|
| | | Controllable interval using mobile terminal | | | |
| Purchase | Set or adjust flight route | Display product delivery progress status | Exchange information before landing for delivery | Prepare for handing in product | Exchange information before landing for delivery |
| S1 | S2 | S3 | S4 | S5 | S6 |

FIG. 28
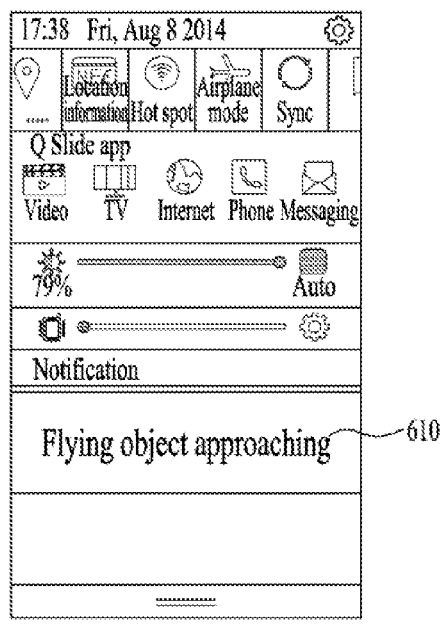
(a)
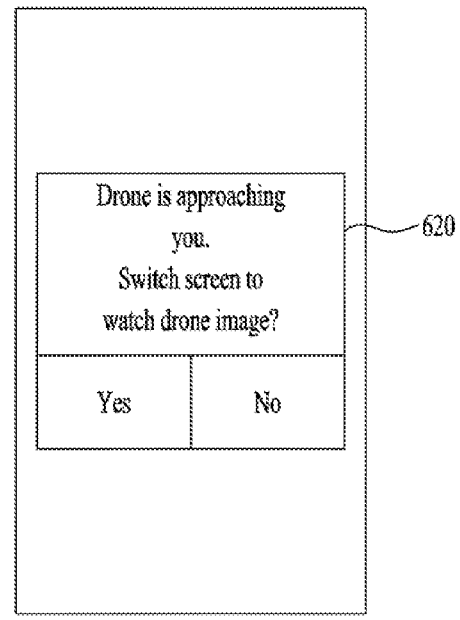
(b)

FIG. 31
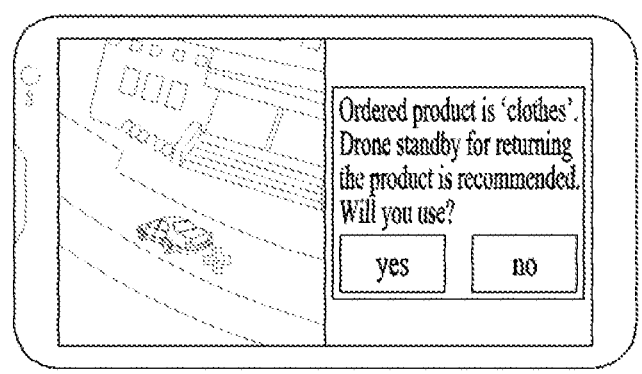
(a)
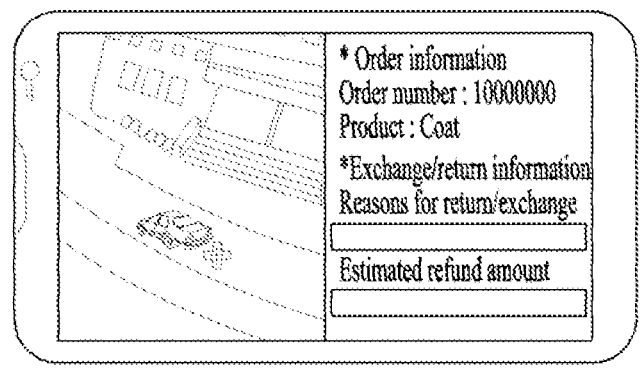
(b)

FIG. 32
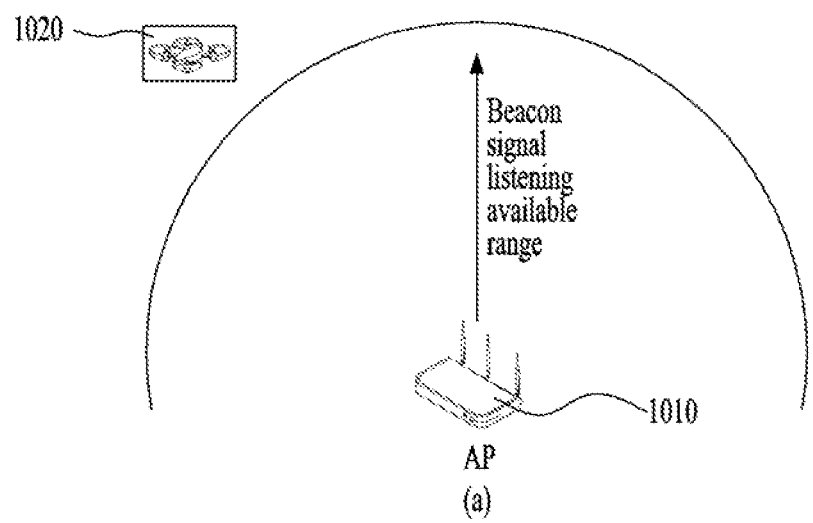
(a)
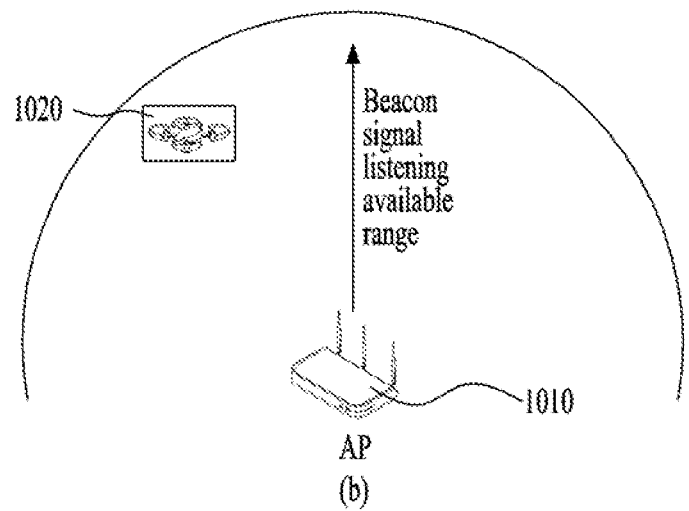
(b)

FIG. 33
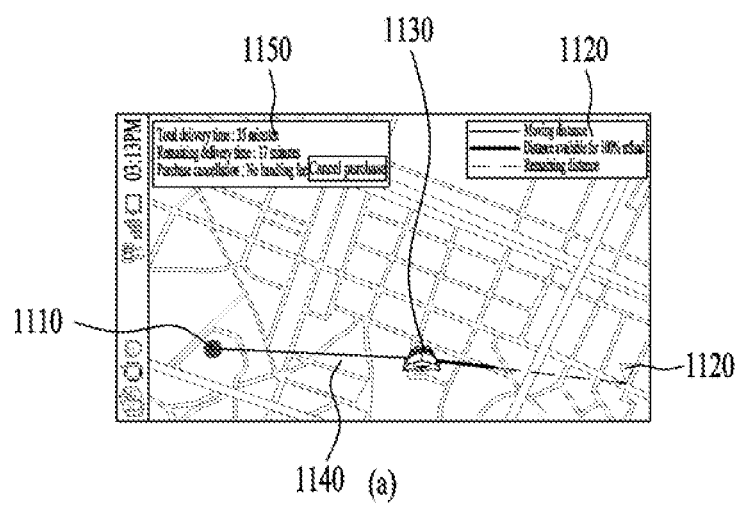
(a)
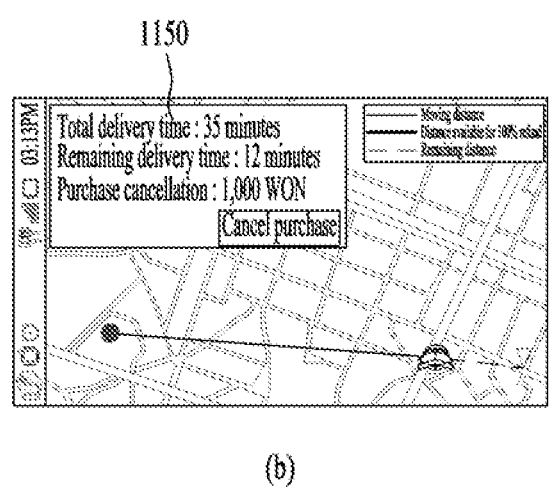
(b)

FIG. 34
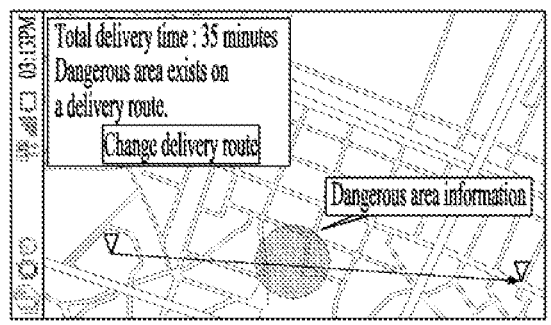
(a)
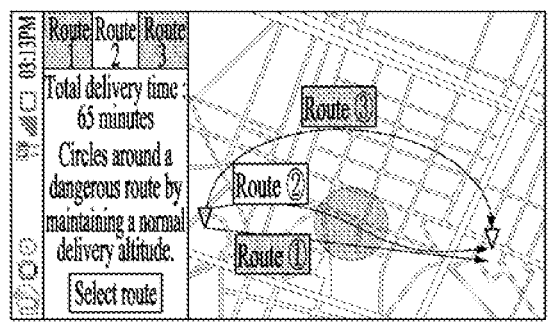
(b)
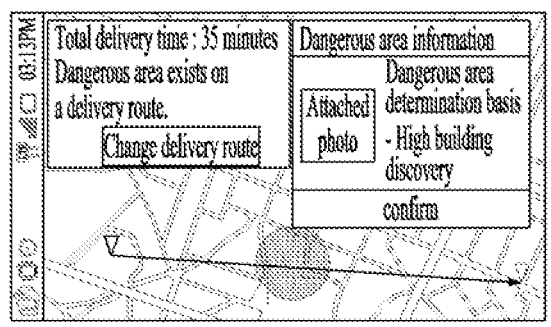
(c)

MOBILE TERMINAL AND CONTROLLING METHOD THEREOF

Pursuant to 35 U.S.C. § 119(a), this application claims the benefit of earlier filing date and right of priority to Korean Application No. 10-2014-0158833, filed on Nov. 14, 2014, and Korean Application No. 10-2014-0162562, filed on Nov. 20, 2014, the contents of which are hereby incorporated by reference herein in their entireties.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for remotely controlling a flying object equipped with a camera.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

The ongoing developments of the IT technology fields have influence on the field of small flying objects. For instance, a helicam (helicopter camera) tends to be used instead of a camera in a movie set. And, it is attempted to use a drone for the delivery of a small product. However, so far, only a flying trace of the above-mentioned small flying object can be remotely controlled by a signal transmitted from a remote controller, a server or the like.

SUMMARY OF THE INVENTION

Accordingly, embodiments of the present invention are directed to a mobile terminal and controlling method thereof that substantially obviate one or more problems due to limitations and disadvantages of the related art.

The present invention is directed to substantially obviate one or more problems due to limitations and disadvantages of the related art, and an object of the present invention is to provide a mobile terminal and controlling method thereof, by which user's convenience can be enhanced.

One object of the present invention is to provide a method of widely utilizing a small flying object as a photographing device through linkage between the small flying object and a mobile terminal in controlling the small flying object equipped with a camera such as a helicam and the like.

In particular, one object of the present invention is to provide a mobile terminal and controlling method thereof, by which a small flying object equipped with a camera can be controlled remotely.

Another object of the present invention is to provide a mobile terminal and controlling method thereof, by which a small flying object can be controlled remotely and automatically in accordance with a preset setting value (e.g., a priority, a shot mode, etc.).

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit configured to display information, a wireless communication unit configured to perform a communication with a flying object, and a controller configured to create a group in response to a user input for requesting creation of the group, and if at least one members in the group is set as a target, remotely control the flying object to track and shoot the target.

In another aspect of the present invention, as embodied and broadly described herein, a method of controlling a mobile terminal according to another embodiment of the present invention may include receiving a user input for requesting creation of a group, creating a group in response to the user input, setting at least one members in the group as a target, and remotely controlling a flying object to track and shoot the target.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 8 to 11 are diagrams illustrating examples of a user interface provided to set a shooting scheme;

FIG. 13 is a diagram illustrating one example that a small flying object shoots a shot target based on a priority per shot target;

FIG. 14 is a diagram illustrating one example that a small flying object shoots a shot target based on a quantity assigned per shot target;

FIG. 15 is a diagram illustrating one example that a small flying object shoots a shot target if a priority is set by unit of a plurality of objects;

FIG. 22 is a diagram illustrating another example of performing a video editing;

FIG. 23 is a diagram illustrating one example of sharing a video;

FIG. 24 is a schematic diagram of a product receiving sequence according to an embodiment of the present invention;

FIG. 28 is a diagram illustrating one example of outputting a message through a mobile terminal;

FIG. 31 is a diagram illustrating one example of outputting a popup window;

FIG. 32 is a diagram illustrating one example of recognizing that a flying object has approached a delivery destination;

FIG. 33 is a diagram illustrating one example of outputting a map for displaying a flight status of a flying object;

FIG. 34 is a diagram illustrating one example of selecting a flight route of a flying object;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
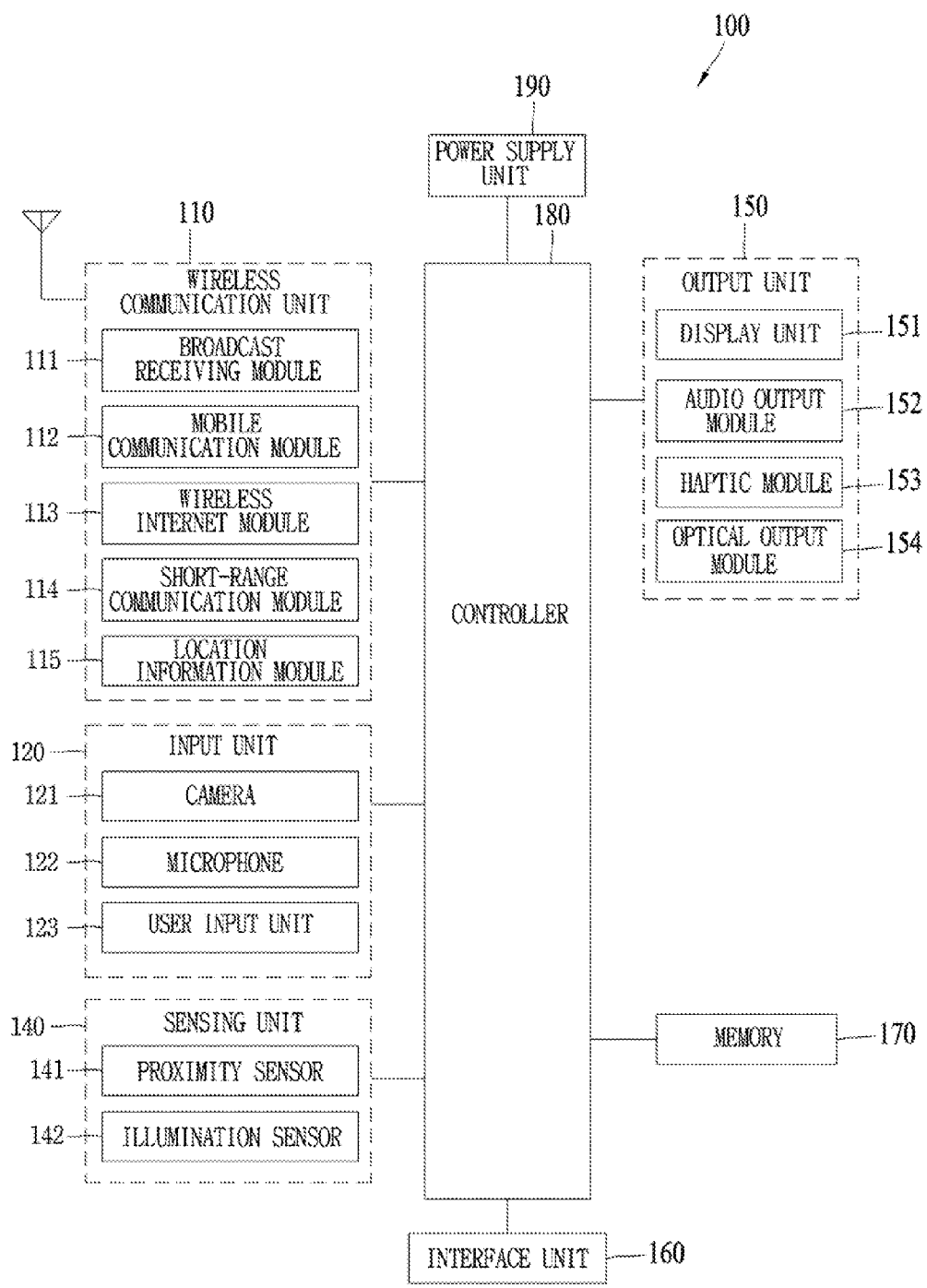
FIG. 1A is a block diagram of a mobile terminal in accordance with the present disclosure.
Figure 1B:
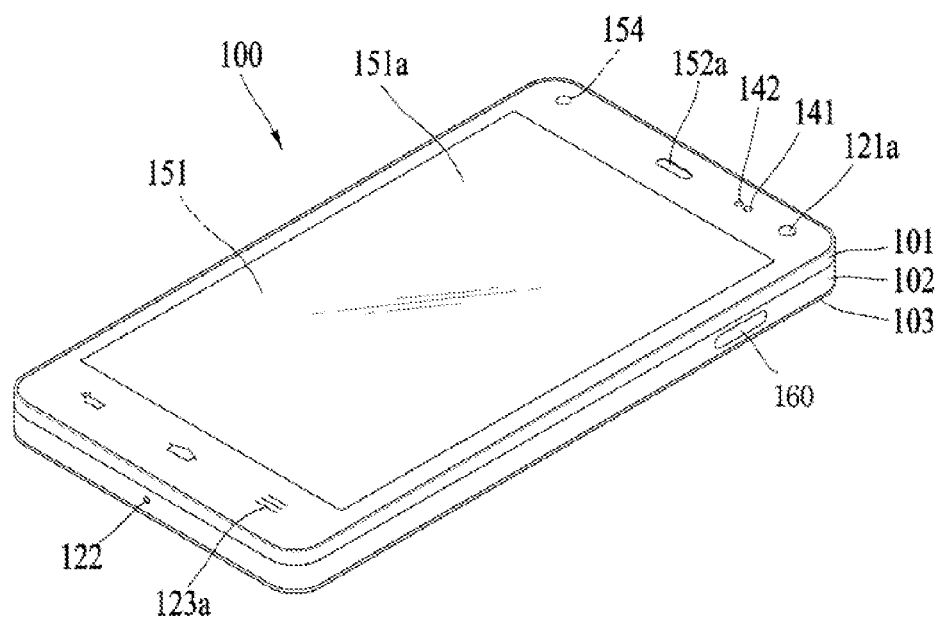
FIGS. 1B and 1C are conceptual views of one example of the mobile terminal, viewed from different directions.
Figure 1C:
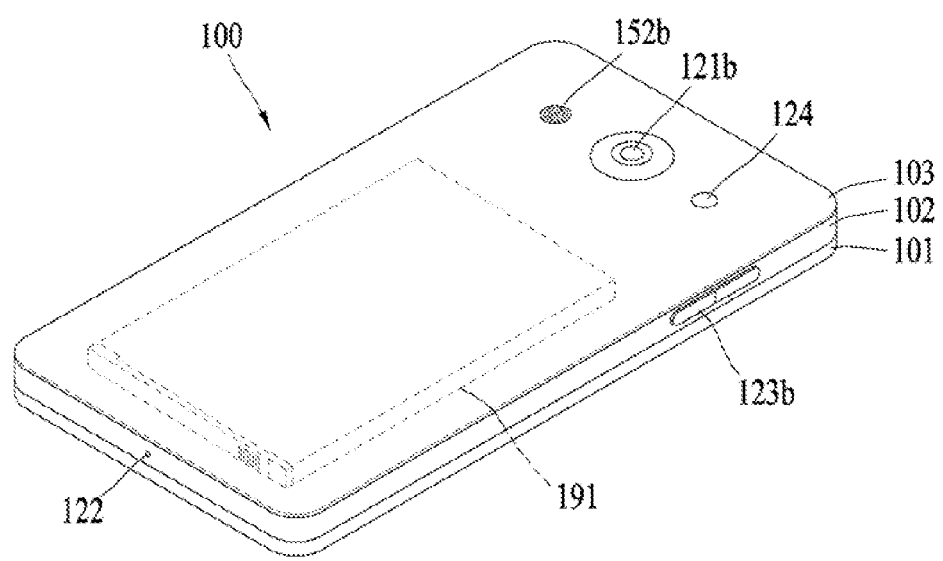

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

According to an embodiment of the present invention, a mobile terminal can be used to control a small flying object. In this instance, the small flying object may mean an aircraft in shape of an airplane or helicopter flying by radio guidance without a person onboard and may include one of a drone, a helicam (helicopter camera), an RC (remote controlled) helicopter and the like. In particular, the mobile terminal can be used to remotely control a flight path and a flight speed of a drone, a helicam, an RC helicopter, or the like.

In this instance, a camera may be installed on the small flying object remotely controlled by the mobile terminal. Hence, the small flying object can shoot a photo, a video and the like through the camera while flying. And, the camera can be remotely controlled by the mobile terminal.

According to an embodiment of the present invention, a mobile terminal configured to remotely control a small flying object can include at least one of the components shown in FIGS. 1A to 1C. For instance, the mobile terminal according to an embodiment of the present invention may be assumed as including the wireless communication unit 110, the display unit 151, the memory 160 and the controller 180.

The wireless communication unit 110 can play a role in performing a wireless communication with a small flying object. In particular, the controller 180 can transmit a remote control signal to the small flying object through the wireless communication unit 110. And, the controller 180 can receive data from the small flying object. Further, the communication system between the mobile terminal and the small flying object may include at least one of Bluetooth, Wi-Fi, Zigbee and the like. Moreover, communication systems other than Bluetooth, Wi-Fi and Zigbee can be used for the communication between the mobile terminal and the small flying object. For instance, the mobile terminal and the small flying object can communicate with each other through such a mobile communication network as LTE, HSDPA, or the like. However, for clarity of the description, assume that the communication system between the mobile terminal and the small flying object employs Bluetooth in the embodiments mentioned in the following description.

Besides, the mobile terminal according to an embodiment of the present invention shall be described in the following on the assumption that the display unit 151 includes a touchscreen. Of course, it is not necessary for the display unit 151 to include the touchscreen. If the display unit 151 does not include the touchscreen, touch inputs mentioned in the following description can be substituted with user inputs of different types (e.g., an action of pushing a physical button of the mobile terminal, a gesture input using the mobile terminal, etc.).

Figure 2:
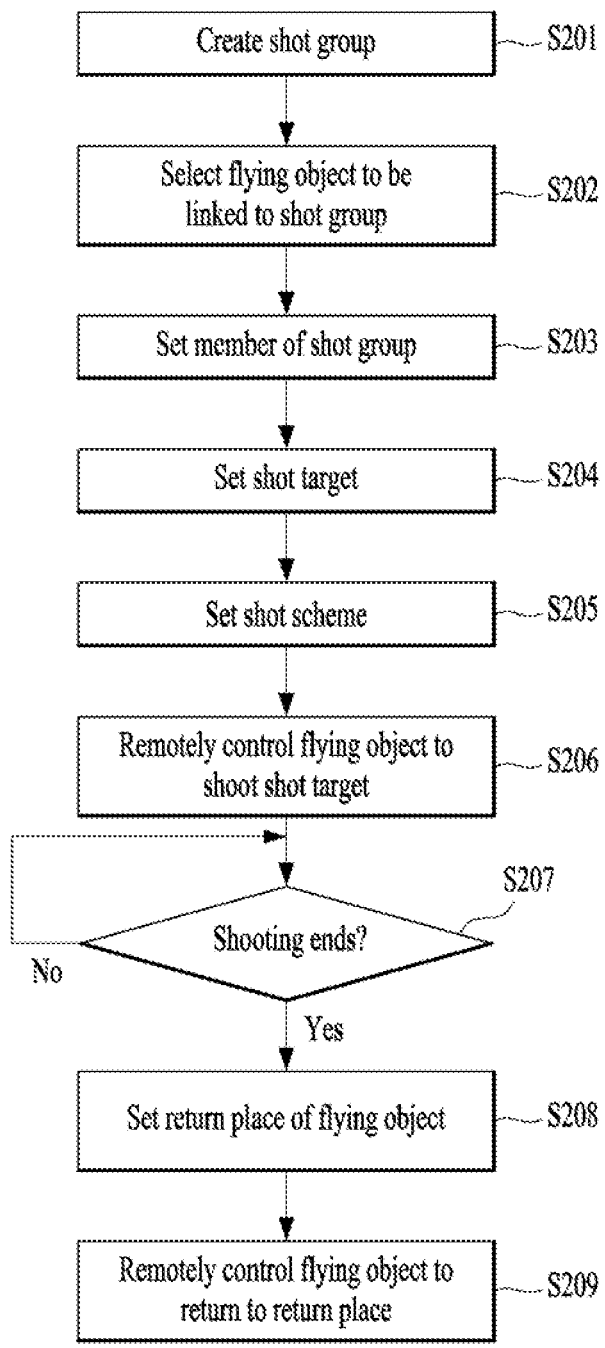
FIG. 2 is a flowchart for an operation of a mobile terminal according to one embodiment of the present invention.

Based on the above descriptions, the mobile terminal according to an embodiment of the present invention is described in detail as follows. In particular, FIG. 2 is a flowchart for an operation of the mobile terminal 100 according to one embodiment of the present invention. Referring to FIG. 2, a mobile terminal can create a shot group for designating a shot target of a small flying object (S201). If the shot group is created, the controller 180 can select a small flying object which will interwork with the created shot group (S202).

Figure 3:
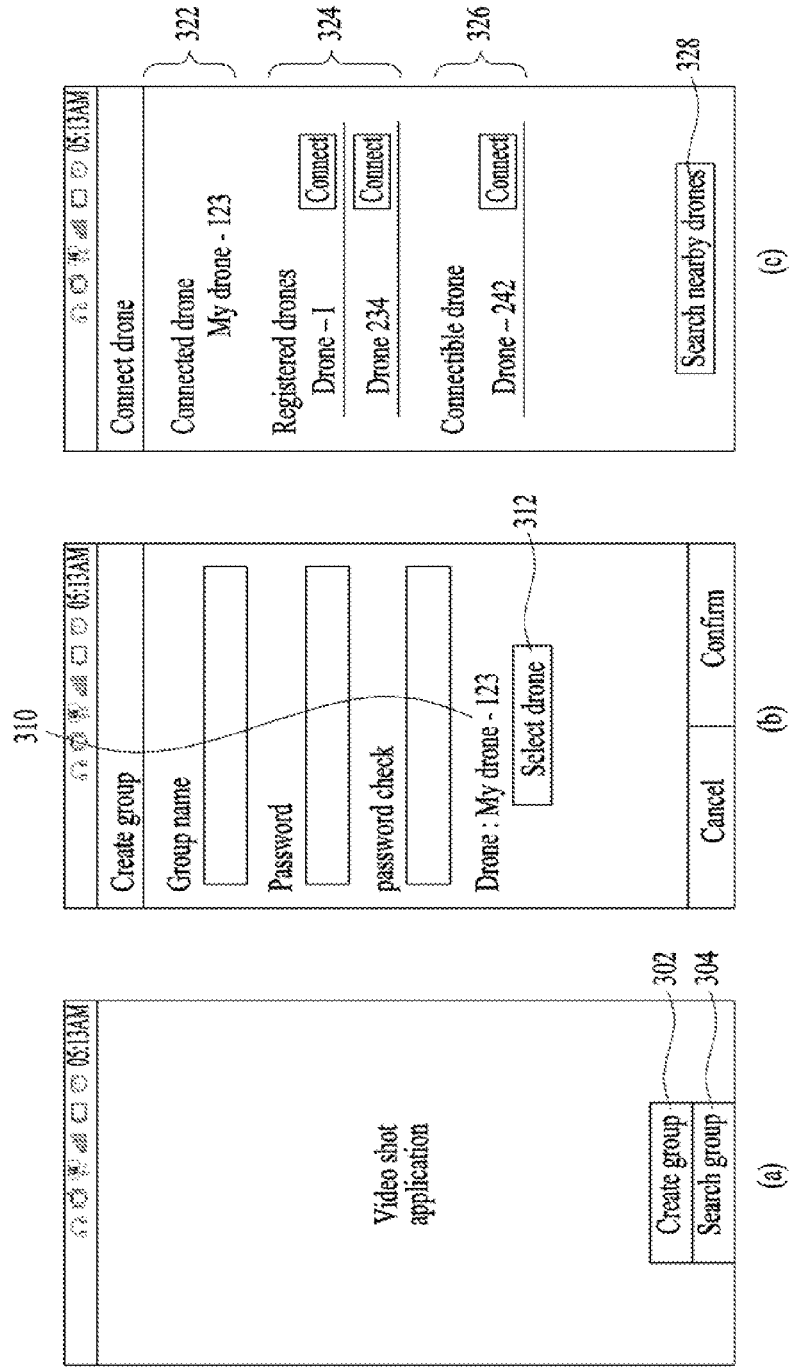
FIG. 3 is a diagram illustrating one example that a shot group is created and that a small flying object interworks with the created shot group.

For instance, FIG. 3 is a diagram illustrating one example that a shot group is created and that a small flying object interworks with the created shot group. After an application for remotely controlling a small flying object has been launched, if a 'create group' item 302 is selected by a user's manipulation (FIG. 3 (a)), the controller 180 can control a screen, which is provided to set a name and password of a group to create, to be output. If the mobile terminal established a wireless communication channel with a specific flying object already (e.g., a state that a pairing with the specific flying object has been completed), the controller 180 can output an identification information 310 (e.g., a name of the existing connected flying object) of an existing connected flying object.

If a user input for changing a flying object to link to a group to create is received (e.g., a touch to a 'select drone' button 312 shown in FIG. 3 (b)), the controller 180 can output a list of flying objects associable with the group to be created (FIG. 3 (c)). According to the example shown in FIG. 3 (c), the flying object list is output by being classified into three categories including a flying object 322 connected to the mobile terminal already, a flying object 324 previously registered at the mobile terminal, a flying object 326 connectable to the mobile terminal, and the like. The three categories shown in FIG. 3 (c) are exemplarily illustrated for clarity of the description only, by which the present invention is non-limited. Unlike the example shown in FIG. 3, a connectable flying object list may be output without the category classification.

If a prescribed flying object is selected from the flying object list, the controller 180 attempts an access to the selected flying object (e.g., attempts a pairing with the selected flying object). If the access to the selected flying object is successfully complete, the controller 180 can link the selected flying object to the group. If a flying object to be connected does not exist in the flying object list, a user can attempt a nearby small flying object search through the mobile terminal. For instance, referring to FIG. 3 (c), if 'search nearby drones' button 328 is touched, the controller 180 can search for a connectable flying object by broadcasting a signal for scanning a flying object or receiving a signal transmitted from a flying object. If a newly found flying object is selected, the controller 180 can attempt an access to the newly found flying object.

According to the example shown in FIG. 3 (a), 'search group' item 304 may be provided to join a shot group previously created by a different terminal. In particular, if the 'search group' item 304 is selected, the controller 180 searches for shot groups created by different terminals and can control a search result to be output. If a prescribed shot group is selected from the found shot groups, the controller 180 can make a request for joining the selected shot group to the terminal having created the corresponding shot group.

The user interface shown in FIG. 3 is provided for clarity of the description only, by which the present invention is non-limited. For instance, shot groups can be created or found by a scheme different from the user interface shown in FIG. 3. If the selection of the flying object intended to be linked to the group is complete and the settings of the group name and password are complete as well, a shot group for the shooting of the small flying object can be created. Subsequently, the controller 180 can configure members to join the shot group (S203). In particular, the controller 180 can send a message for inviting to the shot group to a different terminal intended to be invited to the shot group or may accept or decline a request made by a different terminal intending to join the shot group.

Figure 4:
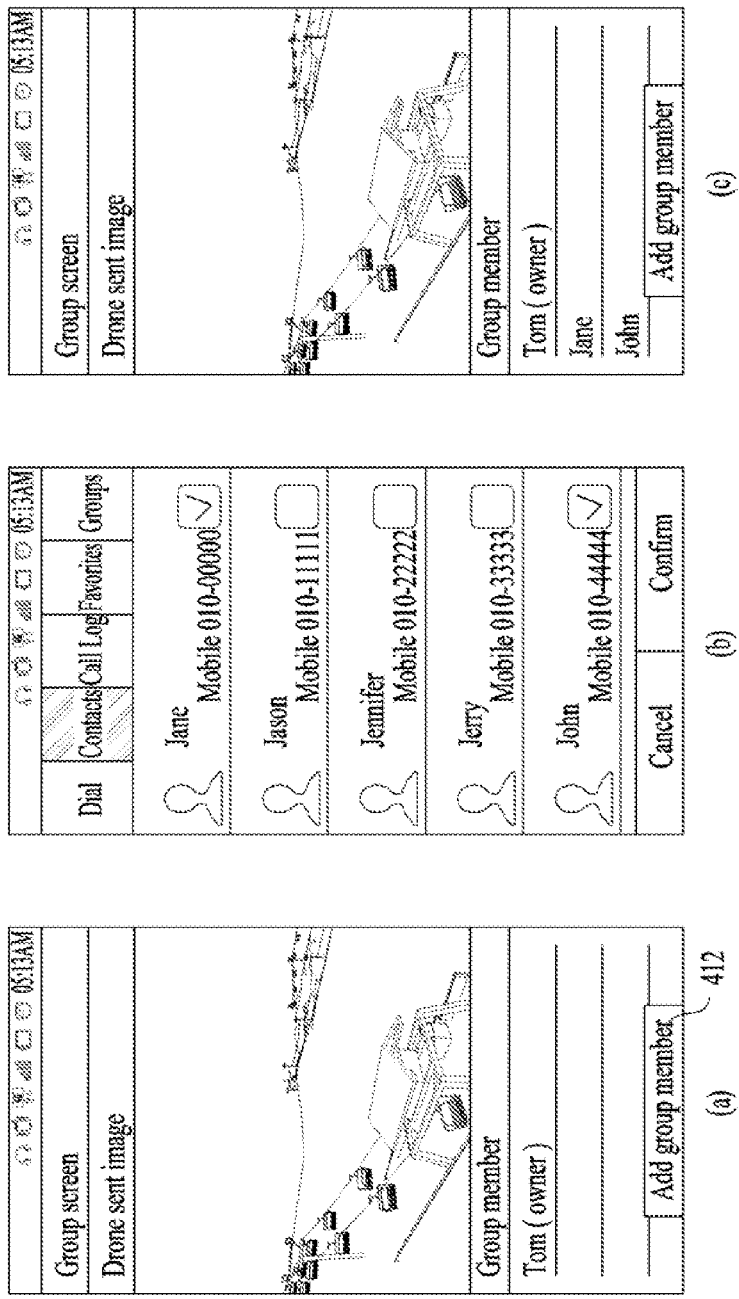
FIG. 4 is a diagram illustrating one example that a different terminal joins a shot group.

For instance, FIG. 4 is a diagram illustrating one example that a different terminal joins a shot group. First of all, a mobile terminal having created a shot group may be in a state of joining the shot group in a position of a group owner. Subsequently, if 'add group member' item 412 is selected (FIG. 4 (a)), the controller 180 can control a user list of users intended to be added as group members to be output (FIG. 4 (b)). In this instance, the user list may include a phonebook saved in the memory 170, a friend list (e.g., a list of an account to which the mobile logs in, and other accounts registered as friends, etc.) received from an external server, a user list (e.g., a list of users connected to the small flying object) received from a small flying object, and the like.

If at least one or more users are selected from the user list, referring to FIG. 4 (c), the controller 180 can invite the selected user to the shot group. In another instance, if the mobile terminal receives a request for joining the shot group from a different terminal, the controller 180 can check whether a correct password was input by the different terminal having made the request for joining the shot group. For example, as mentioned in the foregoing description with reference to FIG. 3, if the different terminal makes the request for joining the shot group with a password matching a former password set on creating the shot group, the controller 180 can allow the corresponding terminal to join the shot group. Otherwise, if the different terminal makes the request for joining the shot group with an incorrect password, the controller 180 can prevent the corresponding terminal from joining the shot group.

Unlike the above-mentioned example, if the terminal makes the request for joining the shot group, the controller 180 can control a message, which indicates that the terminal has made the request for joining the shot group, or a popup window containing the corresponding message to be output.

In this instance, the controller 180 can determine whether to allow the terminal to join the shot group in accordance with a user's input value.

Once a shot group is created, a prescribed member of the shot group may be set as an owner of the shot group. The terminal set as the owner plays a role in receiving data from a flying object and controlling the flying object remotely. Thus, the owner terminal needs to be paired with a small flying object. Basically, the terminal having created the shot group can be set as the group owner. However, a terminal currently joining the shot group may be set as the owner of the shot group. For clarity of the description of the following embodiment, assume that the mobile terminal according to an embodiment of the present invention is set as the owner of the shot group.

Once the shot group is created, the mobile terminal positioned as the group owner can receive a preview image from the small flying object. If so, the controller 180 decodes the received preview image and can then output the decoded preview image through the display unit 151. Hence, before the small flying object shoots a video, a user can check images input to the small flying object in real time. In this instance, the preview image corresponds to an image input to a camera of the small flying object before the small flying object shoots a video.

The controller 180 can receive the preview image from the small flying object from a timing point of creating the shot group or a timing point at which the different terminal joins the shot group. In another example, if there is a request made by a user, the controller 180 can receive the preview image from the small flying object.

Thereafter, the controller 180 can set a shot target of the small flying object by recognizing joining users currently joining the shot group through an analysis of the preview image received form the small flying object (S204). Moreover, the controller 180 can attempt the mapping between each of the recognized joiners and the terminal of the corresponding joining user. In particular, the controller 180 receives a location information from each terminal and can then attempt the mapping between the corresponding terminal and a holder of the corresponding terminal based on the received location information. Thus, the controller 180 can receive the location information or photos of the joining users from the terminals of the users included in the shot group.

Figure 5:
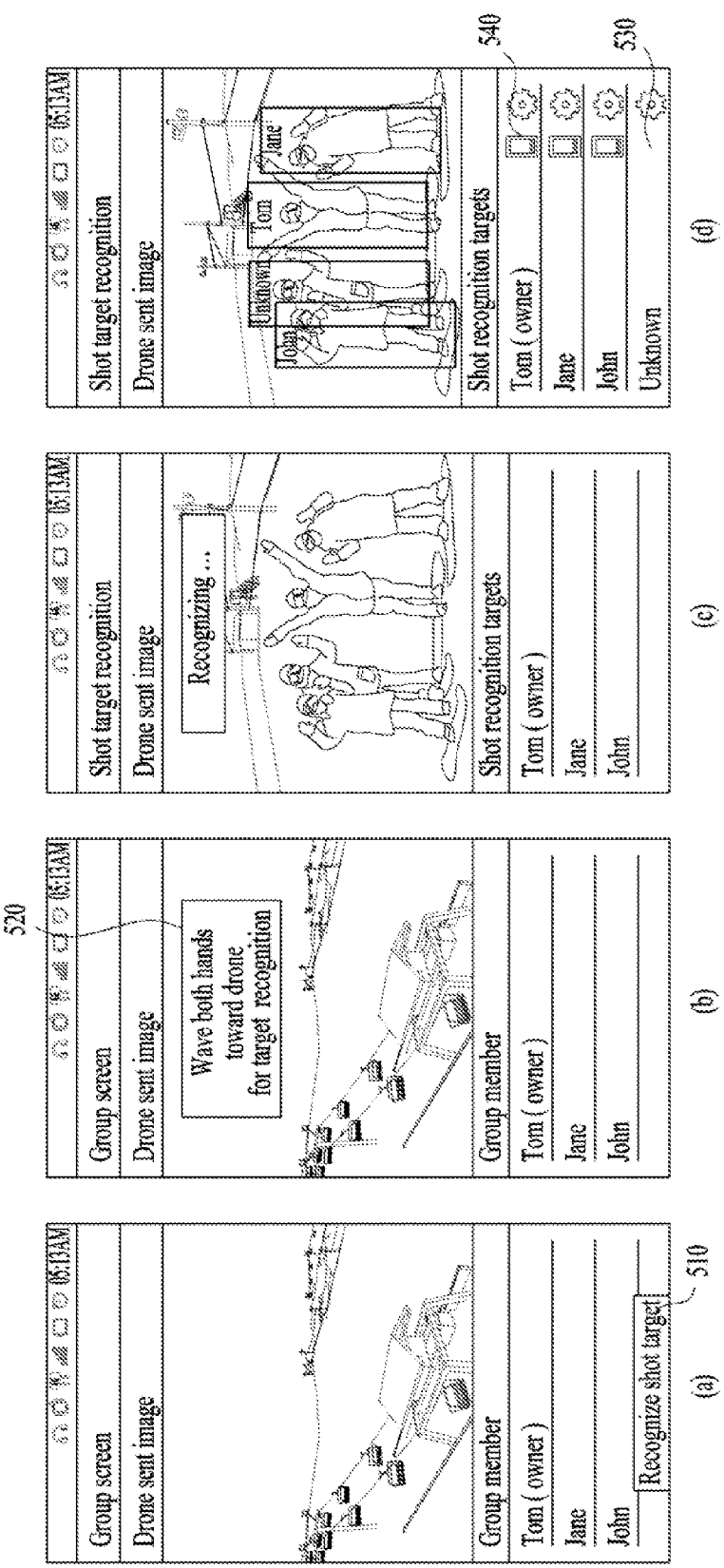
FIG. 5 is a diagram illustrating one example of setting a shot target.

For instance, FIG. 5 is a diagram illustrating one example of setting a shot target. Referring to FIG. 5, if 'recognize shot targets' item 510 is selected (FIG. 5 (a)), the controller 180 can control a popup window 520 indicating a gesture supposed to be taken for the joiner recognition to be output. According to the example shown in FIG. 5 (b), the gesture supposed to be taken by the joiner is a gesture of waving both hands.

If a subject taking a specific gesture is discovered from the preview image received from the small flying object, the controller 180 can recognize that the corresponding subject is a joiner currently joining the shot group. According to the example shown in FIG. 5 (c), since 4 persons raise their both hands in the preview image, the controller 180 can recognize that the 4 persons are the joiners currently joining the shot group. In addition, the recognized joiners can be set as the shot targets.

Further, the controller 180 can perform the mapping between each of the joiners and the terminal currently held by the corresponding joiner. According to the example shown in FIG. 5 (d), Tom, Jane and John are mapped to the terminals held by them, respectively (e.g., an icon 540 of a terminal shape is displayed near to a name of each joiner).

Although the gesture of raising both hands is detected, if the corresponding person fails to belong to the shot group, referring to FIG. 5 (d), the controller 180 can enable the corresponding person to newly join the shot group. According to the example shown in FIG. 5 (d), 'unknown' user 530 is further added to a joiner list. However, since the newly joining person is not mapped to a terminal currently, the newly joining person may be selected as a shot target but may be excluded from shot image data sharing targets.

For clarity of the description, according to the example shown in FIG. 5, the gesture for recognizing a joiner is a gesture of raising both hands, by which the corresponding gesture is non-limited. For example, various gestures (e.g., a gesture of waving a hand, a gesture of making a smile on a face, etc.) can be set as the gesture for selecting a shot target.

According to the example shown in FIG. 5, based on a location of a recognized joiner and a location of a terminal, the mapping between a joiner and a terminal currently held by the joiner is performed. Alternatively, the controller 180 can perform a joiner-to-terminal mapping through a face recognition. In particular, the controller 180 obtains photos of faces of joiners from terminals included in a shot group, respectively and can then execute the joiner recognition based on the obtained photos.

Figure 6:
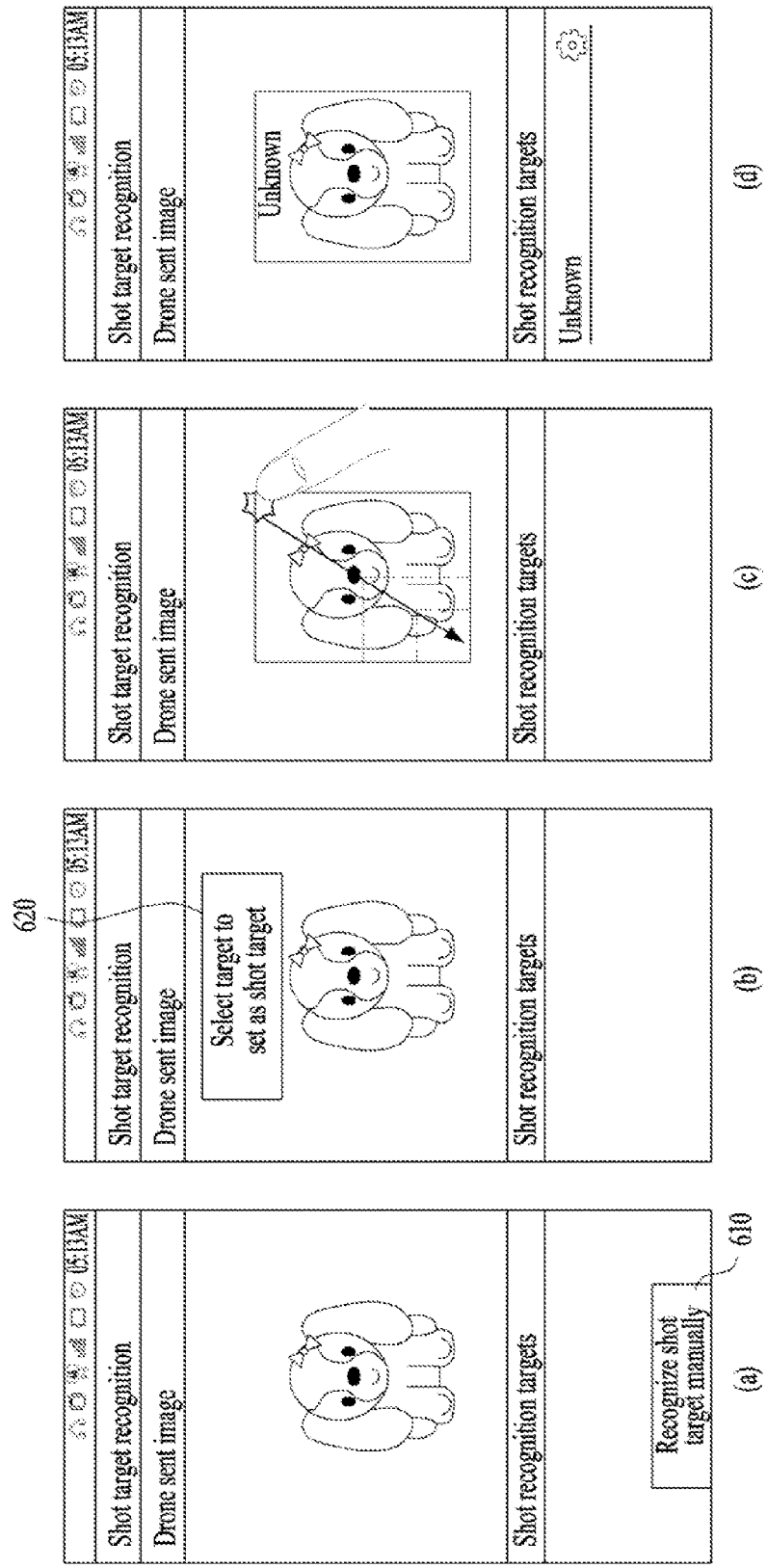
FIG. 6 is a diagram illustrating one example that a target designated by a user is set as a shot target.

In another instance, the controller 180 can set a moving target or a target designated by a user as a shot target. For instance, FIG. 6 is a diagram illustrating one example that a target designated by a user is set as a shot target. Referring to FIG. 6, if 'recognize shot target manually' item 610 is selected (FIG. 6 (a)), the controller 180 can control a popup window 620, which indicates that a target to be designated as a shot target needs to be selected, to be output (FIG. 6 (b)). Subsequently, referring to FIG. 6 (c), if a specific target in a preview image is selected, the controller 180 recognizes the selected target and can then set the selected target as the shot target. Referring to FIG. 6 (d), for example, a dog is set as a shot target and a name of the dog is set to 'unknown'.

Like the examples shown in FIG. 5 and FIG. 6, the controller 180 can set a shot target to a target of taking a specific gesture or a target designated by a user. Moreover, although a prescribed target is not included in a shot group, if a gesture is recognized for the prescribed target or the prescribed target is designated by a user, the prescribed target can newly join the shot group. However, the prescribed target is excluded from shot image sharing targets.

According to the descriptions with reference to FIG. 5 and FIG. 6, a group owner receives a preview image from a flying object and then outputs the received preview image. Unlike the described example, a group owner receives a photo taken by a flying object from the flying object and may be then able to output the received photo. For instance, if a shot group is created, a flying object takes a photo and can then send the taken photo to the mobile terminal.

If so, the controller 180 recognizes whether an object taking a specific pose is in the photo. Subsequently, the controller 180 sets the object taking the specific pose (e.g., a pose of raising both arms) or an object selected from the photo by a user as a shot target. Further, if the shot group is created, the flying object directly takes a photo and then provides the taken photo to the mobile terminal. Alternatively, the flying object periodically takes a photo and then provides the taken photo to the mobile terminal. In another instance, if a request is made by the mobile terminal, the flying object takes a photo and then provides the taken photo to the mobile terminal.

Figure 7:
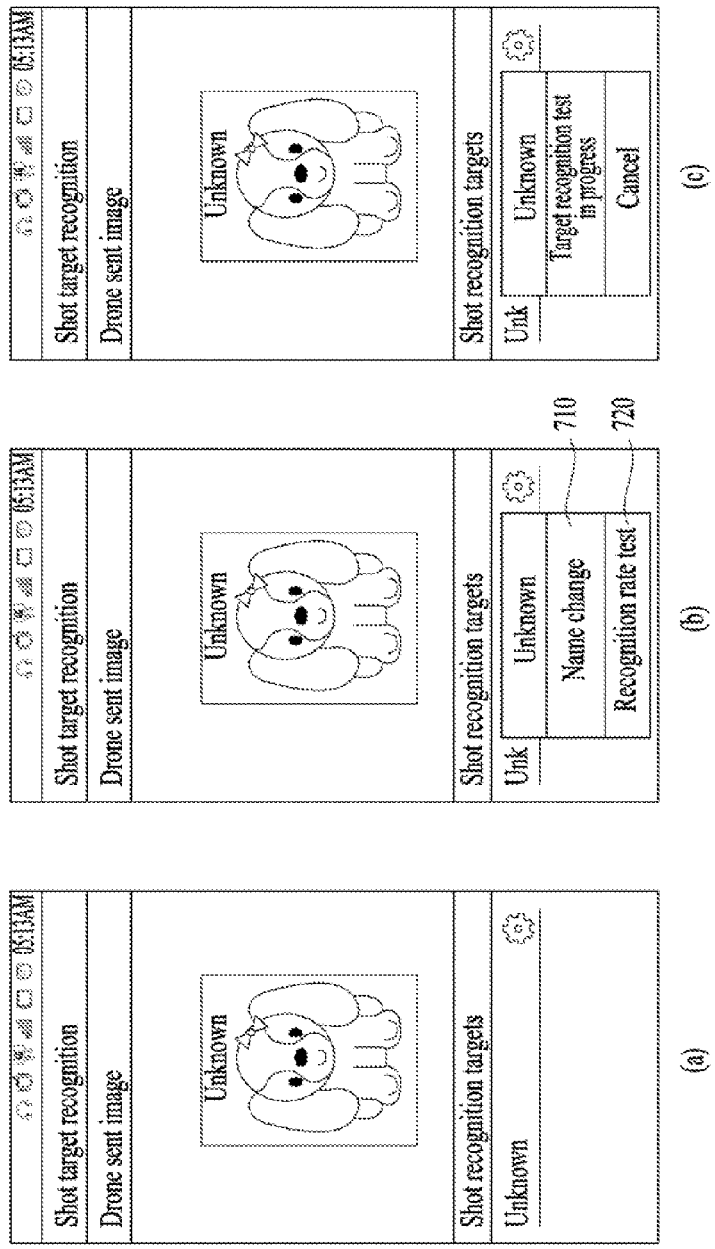
FIG. 7 is a diagram illustrating one example that a test of a recognition rate for a set shot target is in progress.

Once a shot target is set, the controller 180 can perform a recognition rate text on the set shot target. For instance, FIG. 7 is a diagram illustrating one example that a test of a recognition rate for a set shot target is in progress. Referring to FIG. 7, if a specific joiner currently joining the shot group is selected (FIG. 7 (*a*)), the controller 180 can control a menu, which is associated with the selected joiner, to be output (FIG. 7 (*b*)). According to the example shown in FIG. 7 (*b*), 'change name' item 710 may be provided to change a name of the selected joiner in the shot group and 'text a recognition rate' item 720 may be provided to text a recognition rate of the selected joiner. According to the example shown in FIG. 7 (*b*), if the recognition rate text item 720 is selected, the controller 180 can send a control command, which instructs to shoot the selected joiner by tracking, to a small flying object.

Hence, referring to FIG. 7 (*c*), if the small flying object shots the selected joiner by tracking, the corresponding joiner may be regarded as recognized successfully. Further, if the small flying object fails to shoot the selected joiner by tracking the movement of the selected joiner, the recognition of the selected jointer fails and a user can perform a re-recognition on the corresponding joiner. If the shot target setting is completed, the controller 1180 can set up a shooting scheme for the shot target (S205). In particular, the controller 180 can set a priority and a shot mode for the shot target.

Figure 8:
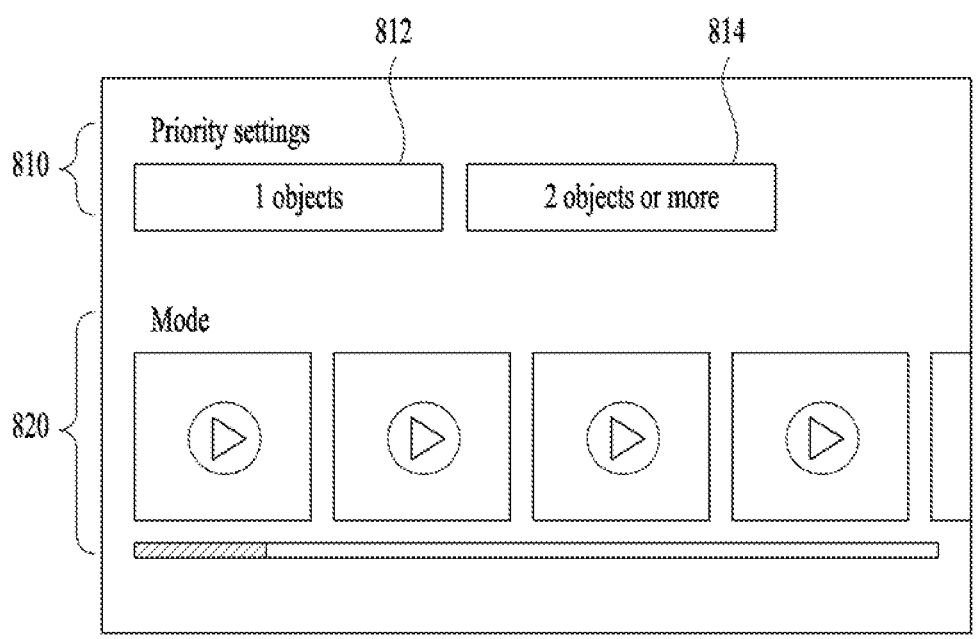

For instance, FIGS. 8 to 11 are diagrams illustrating examples of a user interface provided to set a shooting scheme. Referring to FIG. 8, the controller 180 can configure a user interface to contain a menu 810 for selecting a priority for a shot target and a menu 820 for setting a shot mode for the shot target. In particular, the menu 810 for selecting the priority for the shot target may include an item 812 for setting a priority by a unit of a single object unit and an item 814 for setting a priority by a unit of at least two objects.

Figure 9:
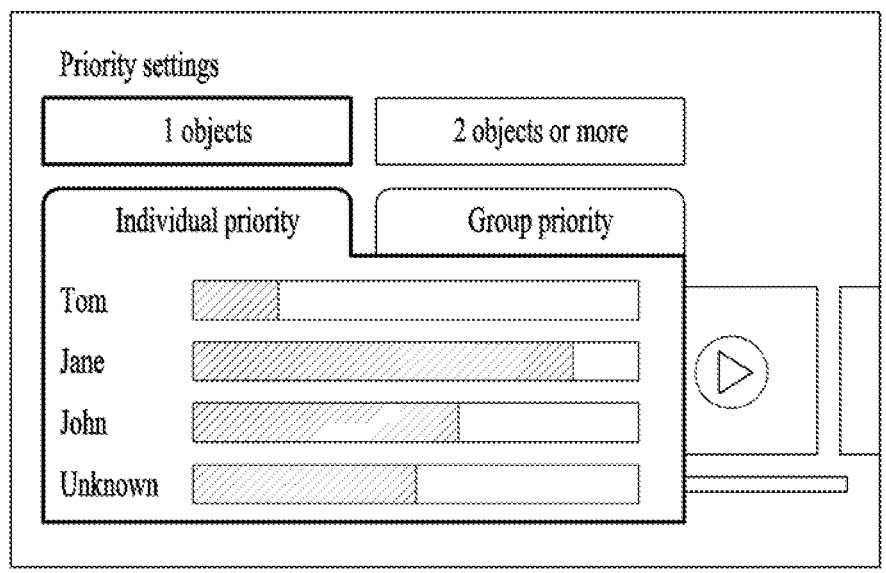

If the item for setting the priority by the unit of single object is touched (FIG. 8), the controller 180 can control a user interface, which is provided to set a priority of each shot target, to be output (FIG. 9). FIG. 9 shows one example that a priority of each shot target is represented as a length of a bar. Hence, a user can adjust a priority of each shot target by adjusting the length of the bar. According to the example shown in FIG. 9, priorities are set in order of Jane, John, Unknown User, and Tom.

Unlike the example shown in the drawing, the controller 180 can represent a priority of each of shot targets based on an area occupied by each shot target in a single figure, a length occupied by each shot target on a single segment of a line, or the like. If the item for setting the priority by the unit of at least two objects is touched (FIG. 8), the controller 180 can control a user interface, which is provided to set a priority for a plurality of shot targets, to be output (FIG. 10).

Figure 10:
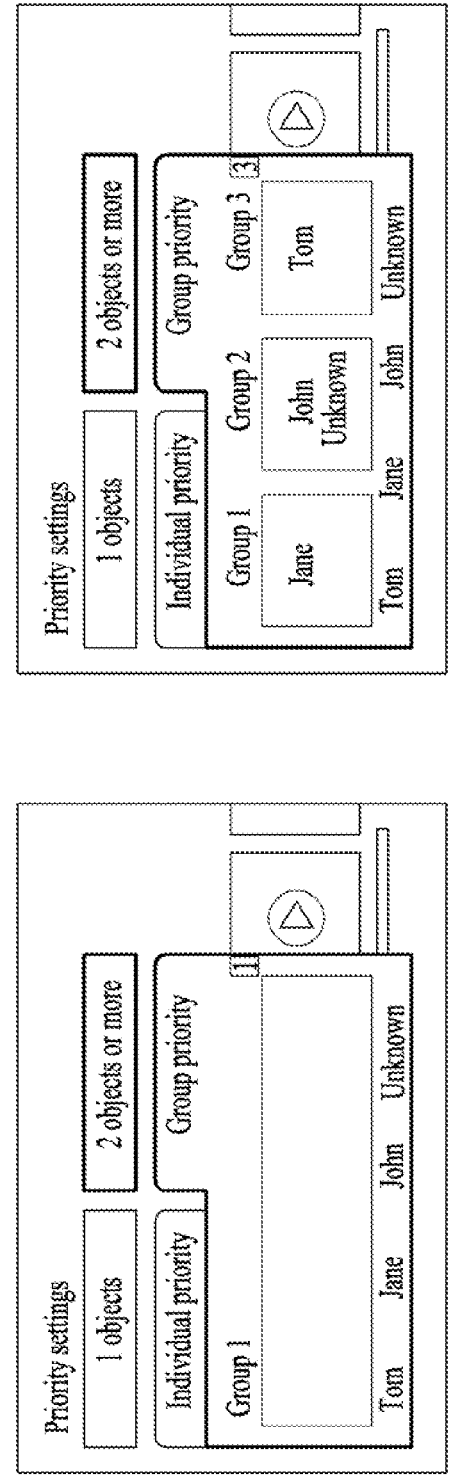

FIG. 10(*a*) shows one example that the number of sample groups is 1 (Group 1). If a user increases the number of the sample groups to 3, referring to FIG. 10(*b*), the controller 180 can increase the number of the sample groups to 3 (e.g., Group 1, Group 2 and Group 3). A user can configure a sample group by dragging to move a shot target to each sample group. According to the example shown in FIG. 10(*a*), Jane is included in Group 1, John and Unknown are included in Group 2, and Tom is included in Group 3. Besides, a prescribed shot target may be included in a plurality of sample groups (not shown in the drawing).

A priority may be given to each group in accordance with a turn or a disposed sequence. In particular, according to the example shown in FIG. 10, Group 1 has a priority higher than that of Group 2. And, Group 2 may have a priority higher than that of Group 3. If the user changes the disposed sequence of Group 2 and Group 3, Group 3 may be set to have a priority higher than that of Group 2.

A user can determine a shot mode through the user interface shown in FIG. 8. In particular, the user can select the shot mode by selecting a prescribed shot mode from the shot mode list shown in FIG. 8. If at least one shot mode is selected from the shot mode list, the controller 180 can control a sample image and guide text, which guide a corresponding shot mode, to be output.

For instance, FIG. 11 is a diagram illustrating one example of an output of a mobile terminal if a prescribed shot mode is selected from a shot mode list. Referring to FIG. 11, if a prescribed shot mode is selected from a shot mode list (FIG. 11(*a*)), the controller 180 can output a sample image 1110 linked to the selected shot mode and a description text 1120 illustrating the selected shot mode (FIG. 11(*b*)).

The shot mode may include one of a specific direction shot mode (e.g., an east shot mode, a west shot mode, a north shot mode, a south shot mode, etc.), an upper body shot mode, a bust shot mode, a face shot mode, a knee shot mode, an entire body shot mode, a scenery shot mode, a rotation shot mode, a dynamic shot mode, a stationary shot mode, a downward shot mode, an upward shot mode, an all shot mode, an individual shot mode, an action shot mode, a smile shot mode, and the like.

A specific direction shot mode is set for a small flying object to capture a shot target in a specific direction. For instance, an east shot mode may be a shot mode for a small flying object to capture an east side and a west shot mode may be a shot mode for a small flying object to capture a west side. The east/west shot mode can be effectively used to avoid an environment (e.g., backlight, etc.) in which a light source (e.g., Sun, etc.) applies light. For example, if a shooting is performed in west shot mode in the morning, since a small flying flies with its back toward the sun, it can avoid the backlight. For example, if a shooting is performed in east shot mode in the afternoon, since a small flying flies with its back toward the sun, it can avoid the backlight.

An upper body shot mode, a bust shot mode, a face shot mode, a knee shot mode, and an entire body shot mode may be provided to determine a range of a part of a shot target in shooting the shot target. For example, the upper body shot mode may be provided to shoot an upper body of a shot target. And, the bust shot mode may be provided to shoot a part of a body of a shot target above a chest. A knee shot mode may be provided to shoot a part of a body of a shot target above the knees. A face shot mode may be provided to shoot a face of a shot target only. And, an entire body shot mode may be provided to shoot an entire body of a shot target.

In order to shoot a face, bust, upper body or entire body of a shot target, a small flying object can maintain an appropriate distance from an upper body of a shot target. For example, in accordance with the setting values of a distance appropriate for shooting a face, a distance appropriate for shooting a bust, a distance appropriate for shooting an upper body and the like, a small flying object can adjust a distance from a shot target.

Figure 12:
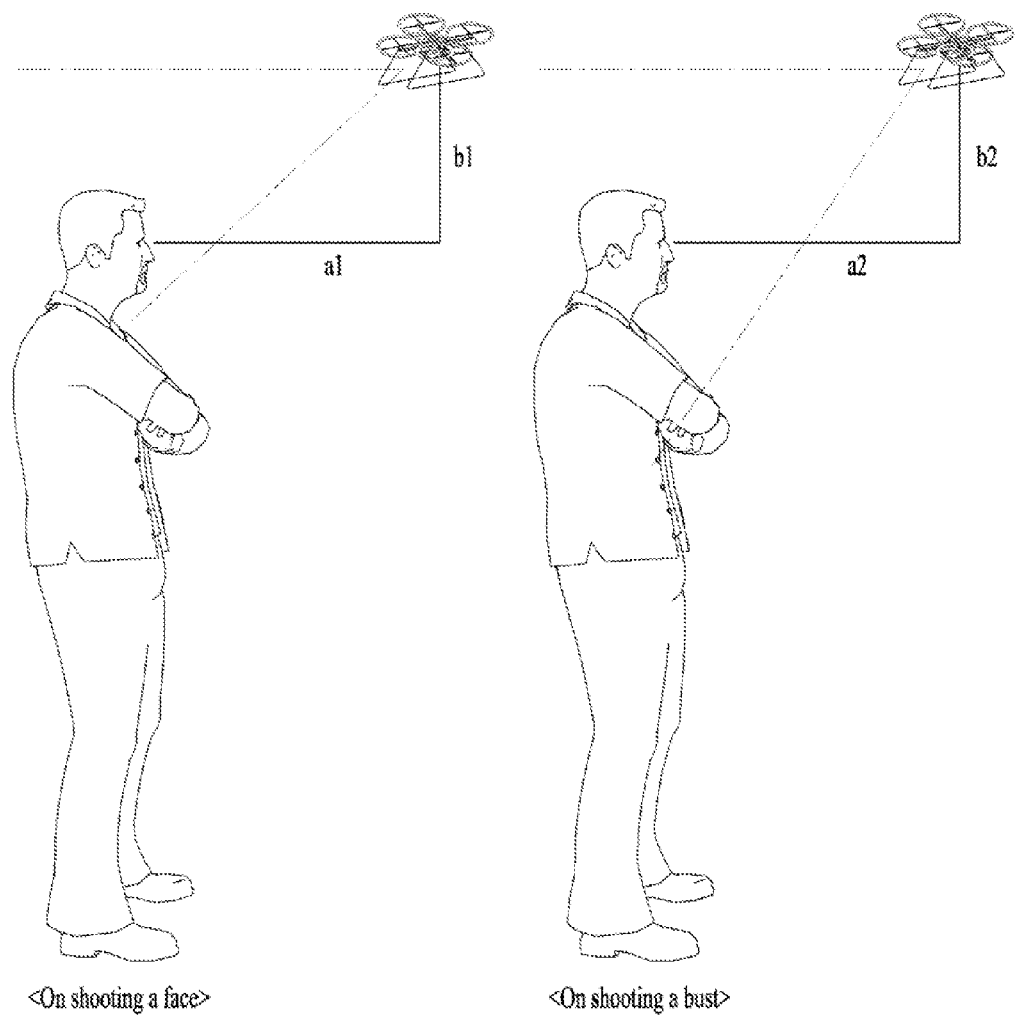
FIG. 12 is a diagram illustrating one example of adjusting a distance between a small flying object and a shot target in accordance with a shot mode.

For instance, FIG. 12 is a diagram illustrating one example of adjusting a distance between a small flying object and a shot target in accordance with a shot mode. Referring to FIG. 12, if a face shot mode is selected, a small flying object can fly by maintaining a horizontal distance a1 and a vertical distance b1 from a shot target. Further, if a bust shot mode is selected, a small flying object can fly by maintaining a horizontal distance a2 and a vertical distance b2 from a shot target. Thus, a distance between a shot target and a small flying object can be adjusted in accordance with a selected shot mode.

A scenery shot mode may be provided to shoot a scenery around a shot target instead of the shot target by raising a flying altitude of a small flying object. If the scenery shot mode is selected, a shot target in a shot image may be displayed small. A dynamic shot mode may be provided for a small flying object to shoot a shot target by moving right and left. As the small flying object moves right and left, the dynamic shot mode may be used to shoot a more dynamic image.

A rotation shot mode may be provided for a small flying object to shoot a shot target by rotating by 360 degrees around a shot target. A stationary shot mode may be provided for a small flying object to track a shot target by hovering and rotating in response to a movement of the shot target. A downward shot mode may be provided for a small flying object to shoot a shot target by looking down on the shot target. And, an upward shot mode may be provided for a small flying object to shoot a shot target by looking up at the shot target.

An all shot mode may be provided to collectively shoot all shot targets. However, when all shot targets cannot be shot at a time, a shooting can proceed based on previously set priorities. An individual shot mode may be provided to shoot shot targets one by one. An action shot mode may be provided to shoot a shot target having a big action or gesture. And, a smile shot mode may be provided to shoot a shot target only if a smile of the shot target is detected. Once the shot mode is selected, the controller 180 can adjust a flight trace of the small flying object, a zoom-in/out level of the small flying object, a composition, and the like.

According to the above example, various kinds of shot modes are listed, by which the present invention is non-limited. And, other shot modes should be applicable to the present invention as well as the above-mentioned shot modes. For instance, a sound shot mode provided to shoot a sounding place and the like can be further included. Moreover, at least two shot modes may be selected simultaneously. For instance, if both of the individual shot mode and the smile shot mode are simultaneously selected, the controller 180 can control the small flying object to shoot each shot target by shooting a smiling person preferentially.

If the shot priority and the shot mode are set, the controller 180 can control the small flying object to shoot a video according to the set shot priority and the set shot mode (S206). In particular, the controller 180 can adjust a flight trace of the small flying object in accordance with the set priority and the set shot mode or may control the small flying object to adjust a flight trace by itself by sending a location information of the shot target or a face information of the shot target to the small flying object. After the video shooting has been initiated, the priority, the shot mode and the like may be changed in response to a user input. Once the priority or the shot mode is changed, the controller 180 can control the video shooting to be resumed in accordance with the changed priority or the changed shot mode.

In the following description, by distinguishing a case that a priority is set by a unit of a single object from a case that a priority is set by a unit of a plurality of objects, one example for a small flying object to shoot or make a video is described in detail with reference to the accompanying drawing. FIG. 13 is a diagram illustrating one example that a small flying object shoots a shot target based on a priority per shot target. For clarity of the following description, as shown in FIG. 13 (a), assume that priorities of shot targets are set to Jane, John, Unknown User, and Tom.

Referring to FIG. 13, the controller 180 can control a small flying object to shoot Jane having a highest priority (FIG. 13 (a)). Thereafter, if the small flying object is unable to shoot Jane any more (e.g., a case that Jane disappears out of sight, a case that the small flying object needs to be spaced apart from a group owner to shoot Jane, etc.), the controller 180 can control the small flying object to shoot John having a priority next to that of Jane.

If the small flying object enters a state that the small flying object is unable to shoot John any more, the controller 180 can control the small flying object to shoot Unknown User having a priority next to that of John. While Unknown User is shot, if the small flying object is unable to shoot Unknown User any more, the controller 180 can control the small flying object to shoot Tom having a priority next to that of Unknown User.

In particular, according to the example shown in FIG. 13, the controller 180 can control the small flying object to shoot the shot targets in order of the priorities of the shot targets. Unlike the example shown in FIG. 13, when the controller 180 is unable to control a shooting of a specific shot target to proceed, the controller 180 can control a shooting of a shot target having a higher priority to proceed again instead of newly staring a shooting of a next-order shot target.

For instance, while a small flying object is shooting John, if the small flying object is unable to further shoot John, the controller 180 can control the small flying object to shoot Jane having the highest priority. If the small flying object is unable to shoot both of Jane having the highest priority and John having the priority next to that of Jane, the controller 180 can control a shooting of Unknown User of the third order to start.

According to the example shown in FIG. 13, when a currently taken shot target is unable to be further shot, a shooting of a next-order shot target starts. Unlike the described example, in response to a user input, the controller 180 can control a shooting of a next-order user to start. For instance, while the small flying object is shooting Jane, if a user input for instructing to shoot a next-order user is received, the controller 180 can control the small flying object to start the shooting of John.

In another instance, the controller 180 can shoot each shot target to correspond to a quantity assigned to each shot target. For instance, FIG. 14 is a diagram illustrating one example that a small flying object shoots a shot target based on a quantity assigned per shot target. For clarity of the following description, like the example shown in FIG. 14 (a), regarding a quantity assigned per shot target, 2 minutes is assumed as assigned to Tom, 8 minutes is assumed as assigned to Jane, 5 minutes is assumed as assigned to John, and 4 minutes is assumed as assigned to Unknown User.

Referring to FIG. 14, the controller 180 can control a shooting to proceed in order of disposed shot targets in a priority setting item. In particular, the controller 180 can control a small flying object to shoot Tom. Further, the controller 180 can control the small flying object to shoot Tom in accordance with a quantity assigned to Tom. Hence, the small flying object may shoot Tom for 2 minutes. If the shooting of Tom is completed, the controller 180 can control the small flying object to shoot Jane in next order. Further, the controller 180 can control the small flying object to shoot Jane in accordance with a quantity assigned to Jane. Hence, the small flying object may shoot Jane for 8 minutes. If the shooting of Jane is completed, the controller 180 can control the small flying object to shoot John for 5 minutes. If the shooting of John is completed, the controller 180 can control the small flying object to shoot Unknown User for 4 minutes.

While a specific shot target is being shot, another shot target may appear in a shot image by accident. For instance, while a quantity of Jane is shot, Jane and John may be shot simultaneously. Thus, although a plurality of shot targets are shot, a quantity for a shot target unintended to shoot may not be deducted. In particular, while Jane is being shot, even if John is shot, a shot quantity of John can be maintained without being deducted.

According to the example shown in FIG. 14, the shooting proceeds in order of disposing the shot targets in the priority setting item. Unlike the example shown in the drawing, the shooting may proceed in order of a shot quantity more or less. In another instance, when the controller 180 shoots a video by targeting all shot targets, if there occurs a situation of being unable to shoot all the shot targets, it can consider priorities. For example, while Jane, Tom, John and Unknown User are shot simultaneously, if there occurs a situation of being unable to shoot all the four persons, it can control the small flying object to shoot one of Jane, Tom, John and Unknown User in consideration of priorities. For instance, assume that rates assigned to Jane, Tom, John and Unknown User are 80%, 20%, 50% and 40%, respectively.

If the small flying object is in a state capable of shooting a prescribed one of Jane, Tom, John and Unknown User, the controller 180 can control Jane of the highest priority to be shot. In another instance, if Jane is in a shot available state and John and Unknown User are in shot available states, the controller 180 can control John and Unknown User, of which sum of the assigned rates is higher (i.e., Jane 80%< (John+Unknown) 90%), to be shot.

When a priority is set by a unit of a plurality of object units, one example for a small flying object to shoot a shot target is described in detail as follows.

FIG. 15 is a diagram illustrating one example that a small flying object shoots a shot target if a priority is set by a unit of a plurality of objects. For clarity of the following description, like the example shown in FIG. 15 (a), assume that 3 sample groups are configured. And, assume that 'Jane and Tom', 'John and Unknown User', and 'Jane and John' are included in Group 1, Group 2 and Group 3, respectively.

Referring to FIG. 15, first of all, the controller 180 can control a small flying object to shoot Jane and Tom corresponding to Group 1 simultaneously. While Jane and Tom are simultaneously shot, if the small flying object enters a state of being unable to shoot at least one of Jane and Tom, the controller 180 can control the small flying object to shoot John and Unknown User corresponding to Group 2. If a state of being unable to shoot at least one of John and Unknown User is entered, the controller 180 can control the small flying object to shoot Jane and John corresponding to Group 3.

Like the example shown in FIG. 15, the controller 180 can control the small flying object to shoot the groups in order of higher priority. According to the example shown in FIG. 15, when a state of being unable to shoot a currently shot group is entered, a next-order group starts to be shot. Unlike the above-described example, the controller 180 can control a shooting of a next-order group to start in response to a user input. For instance, while Group 1 is shot, if a user input of indicating to shoot a next-order group is received, the controller 180 can control the small flying object to start a shooting of Group 2.

According to the examples shown in FIGS. 13 to 15, a small flying object can track a shot target based on a location information received from each terminal or may track a shot target through image processing. For instance, if a face of a shot target is detected from an input image, a small flying object can perform a shooting by tracking the detected shot target.

In another instance, a mobile terminal set as a group owner periodically receives location information from terminals of joiners, respectively and can adjust a flight route of a small flying object based on the location information of the terminal corresponding to a shot target necessary to be shot currently. For further instance, a mobile terminal set as a group owner enables a small flying object to detect a face of a shot target by sending an image of a person corresponding to the shot target to the small flying object.

While a shot target is shot, a small flying object can send a still cut of a currently shot image by periods or in case of a prescribed event occurrence. For instance, while a video of a shot target is shot, if the shot target is determined as a smiling face, a small flying object can send a still cut, which contains the smiling face of the shot target, to a mobile terminal. In another instance, if a video having all shot targets appear therein is shot, the controller 180 can send a still cut having all the shot targets appear therein to a mobile terminal. For further instance, if a shot target to be shot is chanted, a small flying object may send a still cut containing the changed shot target to a mobile terminal. Hence, a user can recognize that a target currently shot by the small flying object is changed.

If a small flying object fails to find a shot target to shoot over a prescribed time, the small flying object can output sound data. If the shot target hears the sound data output from the small flying object and then moves to a place around the small flying object, the small flying object may start to shoot the shot target. While a small flying object is shooting a specific target, if a preset voice is received, the small flying object can make a flight toward or out of the specific target. For instance, while a small flying object is shooting a specific target, if a voice 'Come on Drone (or, Drone, please)' is input, the small flying object can approach the specific target. Further, while a small flying object is shooting a specific target, if a voice 'Go Drone' is input, the small flying object can move away from the specific target. As the small flying object approaches or moves away from the specific target, the same effect of zoom-in or zoom-out can be provided.

According to the examples shown in FIGS. 13 to 15, a small flying object can shoot or record a video of a shot target. Unlike the shown examples, a small flying object can take a photo of a shot target. For instance, if all shot targets (or shot targets over a predetermined rate) look at a small flying object or faces of all shot targets are recognized, the small flying object takes a phot after expiration of a prescribed time and can then send the taken photo to a mobile terminal. In another instance, if a shot target makes a smile or makes a specific gesture, a small flying object can take a photo of the corresponding shot target. For further instance, when a small flying object moves from one spot to another spot, the small flying object can take a photo of a background and a photo of a shot target once. Hence, as the shot target moves, a background per moving spot and an appearance of the shot target per moving spot can be cumulatively photographed. A small flying object may take a photo in the course of shooting a video or may take a photo only separately from a video.

According to the examples shown in FIGS. 13 to 15, a small flying object can shoot a video based on a set priority. Unlike the illustrated examples, a small flying object may keep shooting a shot target selected by a user from a plurality of shot targets only or may shoot a shot target randomly selected from a plurality of shot targets only. According to the examples shown in FIGS. 13 to 15, a shot order per shot target is determined based on a priority. However, a small flying object can randomly determine a shot order.

Once the video shooting is completed (S206), the controller 180 can set a place in which the small flying object will be landed (S207). If so, the controller 180 can remotely control the small flying object to enable the small flying object to land at a current location of the small flying object or a location randomly selected by a user (S208).

Figure 16:
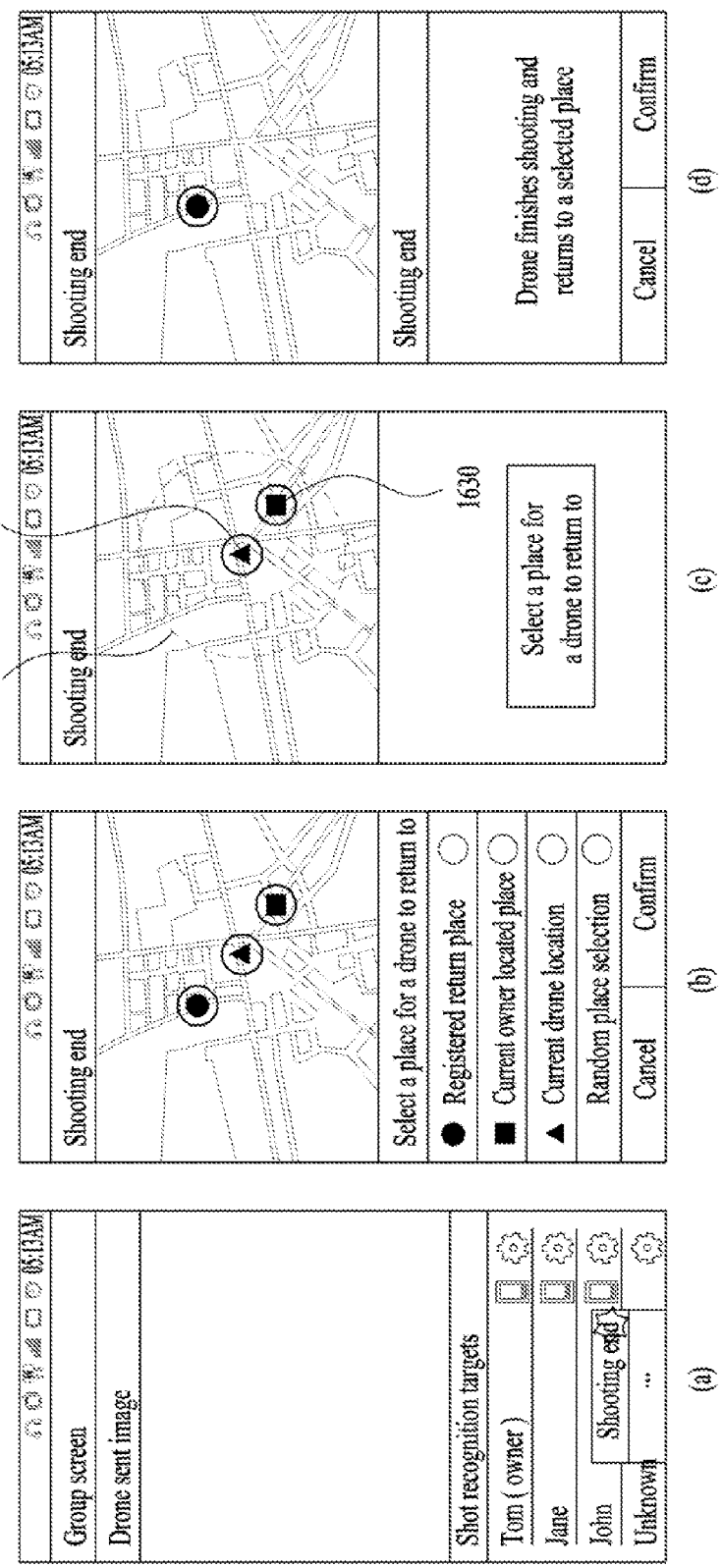
FIG. 16 is a diagram illustrating one example of designating a landing place of a small flying object.

For instance, FIG. 16 is a diagram illustrating one example of designating a landing place of a small flying object. Referring to FIG. 16, if a user input for a user to make a request for ending a video shooting is received (FIG. 16 (a)), the controller 180 can control a menu, which is provided to enable the small flying object to select a place to move to, to be output (FIG. 16 (b)).

In the menu shown in FIG. 16 (b), an item 'return place' may be provided to move a small flying object to a previously registered return place and an item 'current owner located place' may be provided to move a small flying object to a mobile terminal located place. An item 'current drone location' may be provided to land a small flying object in a current location of the small flying object and an item 'random place selection' may be provided to move a small flying object to a place designated by a user.

If the item 'random place selection' is selected (FIG. 16 (b)), the controller 180 can control a map, which is provided to designate a landing place of a small flying object, to be output (FIG. 16 (c)). On the map, a location 1620 of the small flying object and a location 1630 of the mobile terminal can be displayed. Further, like the example shown in FIG. 16 (c), the controller 180 can display a fly limit zone 1610, which is set based on a remaining battery level of the small flying object, of the small flying object. Moreover, a user selectable location may be limited within the flight limit zone.

If a user selects a prescribed location from the map, the controller 180 can control the small flying object to move to the selected location. Moreover, referring to FIG. 16 (d), the controller 180 can output a message indicating that the small flying object is moving to the selected location after finishing the shooting. While the small flying object shooting a video, if the remaining battery level of the small flying object becomes equal to or lower than a battery level required for moving to a previously registered return place or a value resulting from adding a margin value to the battery level required for moving to the previously registered return place, the controller 180 can output a message to give a warning that the small flying object is unable to move to the previously registered return place.

Figure 17:
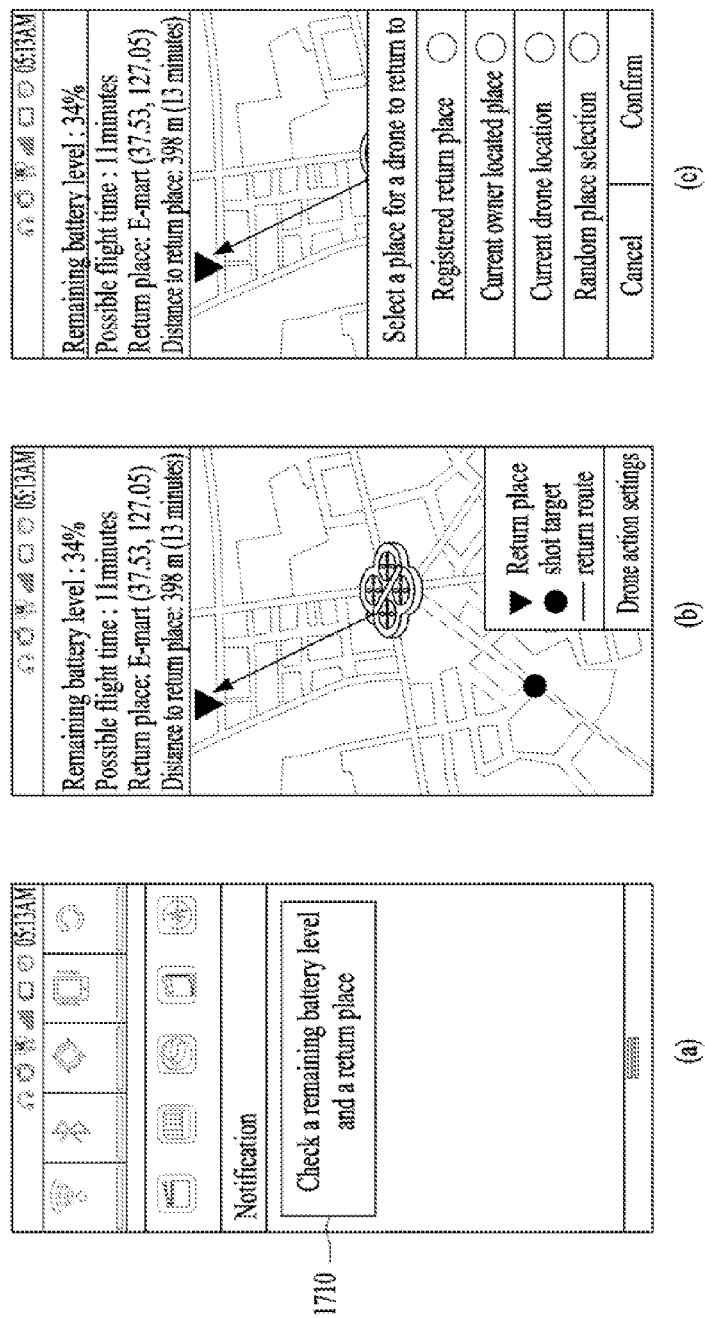
FIG. 17 is a diagram illustrating one example of an operation of a mobile terminal if a remaining battery level of a small flying object becomes equal to or smaller than a prescribed numerical value.

For instance, FIG. 17 is a diagram illustrating one example of an operation of a mobile terminal if a remaining battery level of a small flying object becomes equal to or smaller than a prescribed numerical value. Referring to FIG. 17 (a), if a remaining battery level of a small flying object becomes equal to or lower than a battery level required for moving to a return place, the controller 180 can control a message 1710, which gives a warning that a remaining battery level of the small flying object is low, to be output.

If the message 1710 is touched, referring to FIG. 17 (b), the controller 180 can control a map, which is provided to check the return place of the small flying object, to be output. According to the example shown in FIG. 17 (b), a time for the small flying object to maintain a flight is total 11 minutes, while a time required for the small flying object to move to the return place is 13 minutes.

As the remaining battery level of the small flying object becomes a prescribed numerical value, a user can instruct an action the small flying object should take. For instance, if an item 'drone action setting' is touched (FIG. 17 (b)), the controller 180 can control a menu, which is provided to select an action the small flying object should take, to be output (FIG. 17 (c)).

Referring to FIG. 17 (c), an item 'current owner-located place' may be provided to move the small flying object to a location of a mobile terminal that is a group owner. An item 'current drone location' may be provided to land the small flying object in a current location of the small flying object after ending the shooting. An item 'charging place' may be provided to move the small flying object to a charging place (e.g., a wireless charger) closest to the small flying object. And, an item 'random place selection' may be provided to move a user designated place after ending the shooting.

If a prescribed item is selected from the menu shown in FIG. 17 (c), the controller 180 can remotely control the small flying object to correspond to the selected item. Although the small flying object is set to shoot a specific shot target, if the small flying object is in a state of being unable to shoot the specific shot target, the small flying object can send an information, which indicate that the shot target cannot be shot, to the mobile terminal. If so, the mobile terminal can output a message indicating that the small flying object is unable to shoot the shot target.

Figure 18:
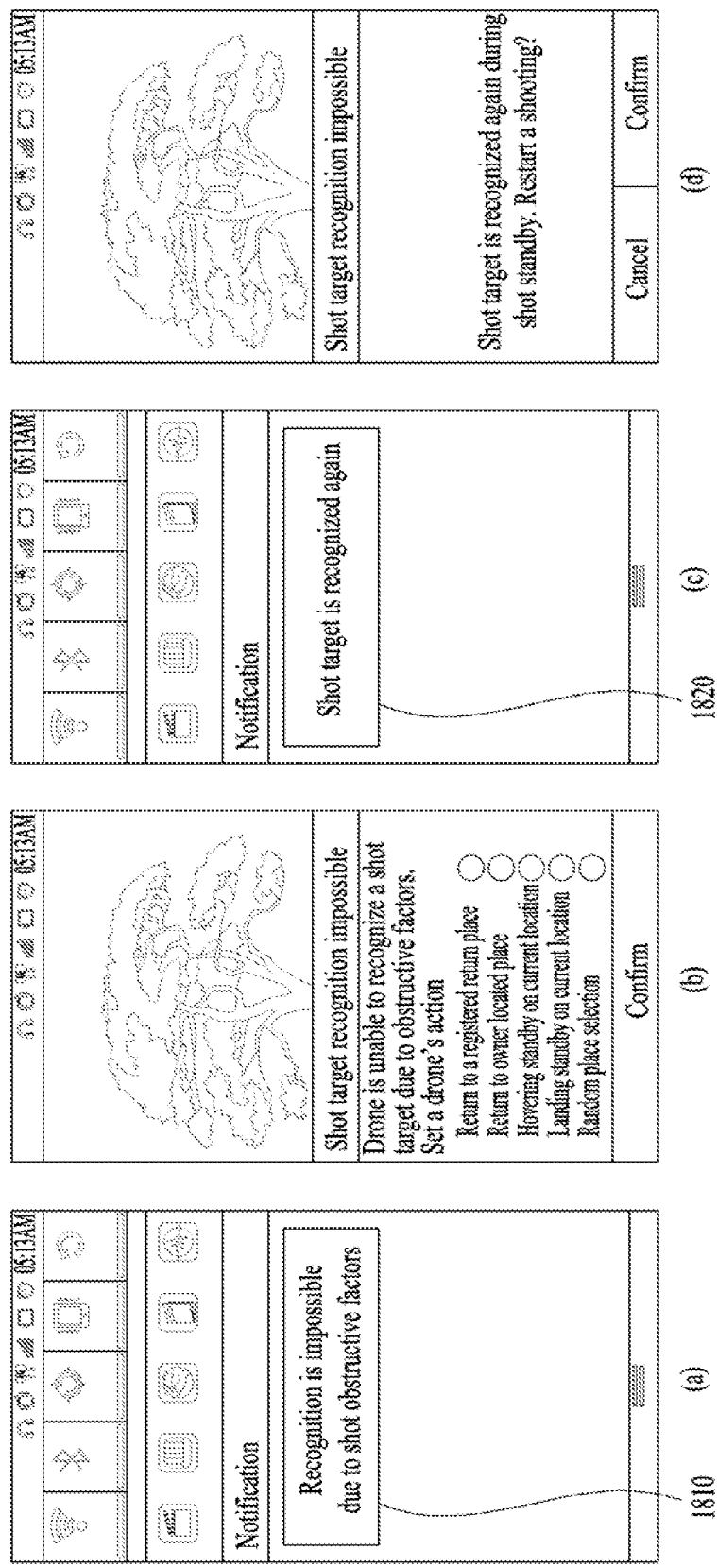
FIG. 18 is a diagram to describe an operation of a mobile terminal if a small flying object is unable to shoot a shot target.

For instance, FIG. 18 is a diagram to describe an operation of a mobile terminal if a small flying object is unable to shoot a shot target. Referring to FIG. 18, as a shot obstructing object exists between a small flying object and a shot target, if the small flying object is unable to shoot the shot target, the small flying object stops the video shooting and can send an information, which indicates that the shot target cannot be shot, to a mobile terminal. As the small flying object misses a shot target, if the small flying object is unable to shoot the shot target, the small flying object stops the video shooting and can send an information, which indicates that the shot target cannot be shot, to a mobile terminal.

If so, referring to FIG. 18 (a), the controller 180 can output a message 1810 indicating that the small flying object is unable to shoot the shot target. If the message 1810 is touched, referring to FIG. 18 (b), the controller 180 can output a message for setting a future operation of the small flying object. According to the example shown in FIG. 18 (b), an item 'return to registered return place' may be provided to move the small flying object to a previously registered return place. An item 'return to owner located place' may be provided to the small flying object to a location of a mobile terminal that is a group owner. An item 'hovering standby on current location' may be provided to make the small flying object fly on a current location until the shot target is recognized again. And, item 'landing standby on current location' may be provided to land the small flying object in a current location. An item 'random place selection' may be provided to move the small flying object to a user selected place.

As the item 'hovering standby on current location' or the item 'landing standby on current location' is selected, while the small flying object is in standby state, if the small flying object finds the shot target, referring to FIG. 18 (*c*), the controller 180 can control a message 1820, which indicates that the shot target is recognized again, to be output. If the message 1820 is touched, referring to FIG. 18 (*d*), the controller 180 can control a popup window, which queries whether to resume the video shooting, to be output. If the video shooting is resumed, the controller 180 can control the small flying object to resume the video shooting of the shot target.

In addition to the example shown in FIG. 18, a small flying object can be determined as unable to shoot a shot target if the small flying object is distant from a mobile terminal (i.e., group owner) over a prescribed distance (e.g., if the small flying object deviates from a remote controllable range of the mobile terminal), if there is possibility of collision in a flight of the small flying object (e.g., if there is possibility in that the small flying object may collide with trees or buildings after entering woods or city area), if the small flying object enters a no-fly zone, or if a remaining battery level of the small flying object becomes equal to or lower than a prescribed numerical value.

While a small flying object is set to shoot a plurality of shot targets, if the shot targets get distant from each other, the small flying object can shoot a plurality of the shot targets at a time by raising its altitude. However, if it is difficult for the small flying object to further raise its altitude (e.g., if it is difficult to recognize a shot target due to a high altitude), the small flying object does not shoot a plurality of the shot targets all but can shoot only the rest of the shot targets except the shot target having left the corresponding group.

Figure 19:
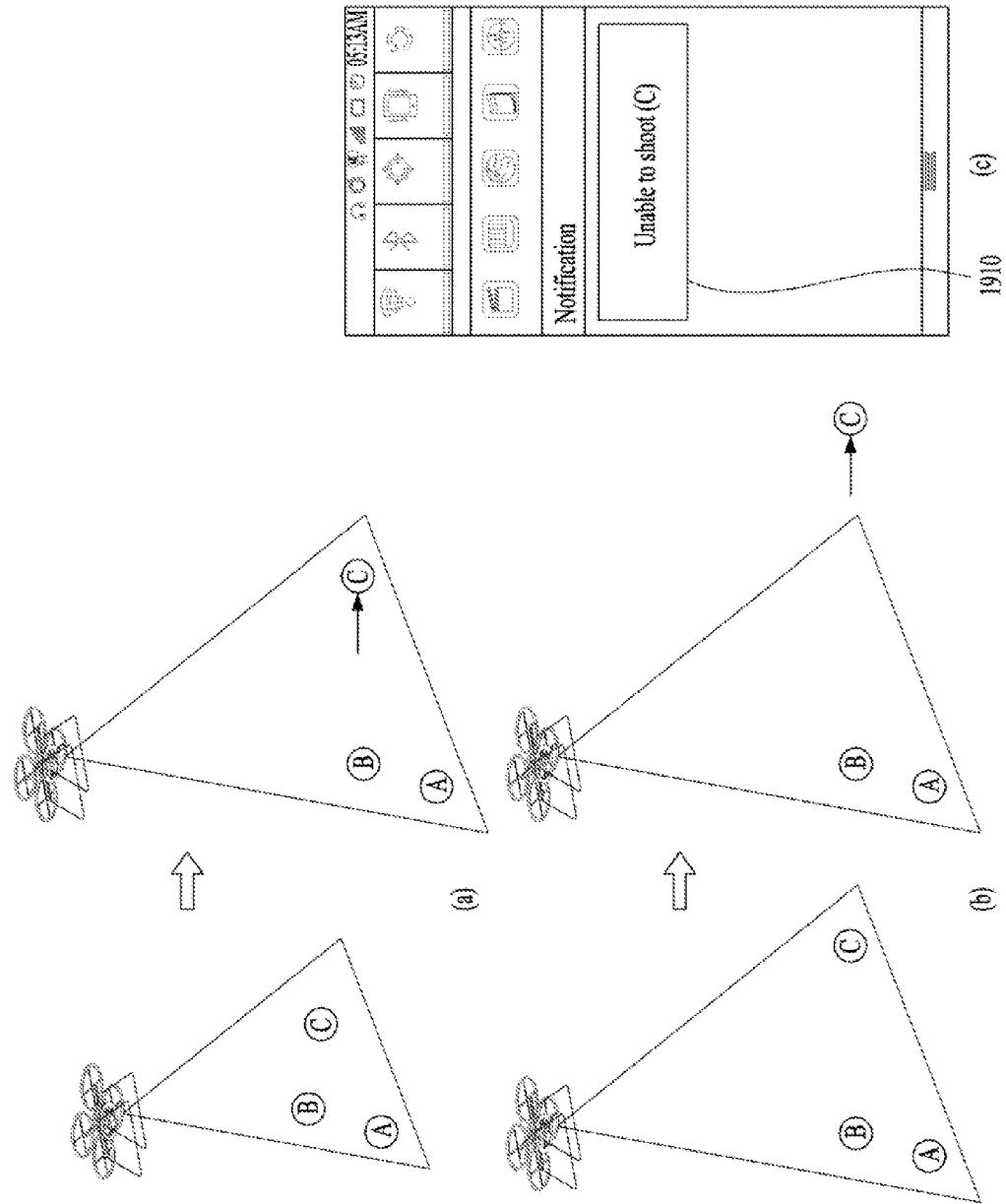
FIG. 19 is a diagram illustrating one example of a case that a prescribed one of a plurality of shot targets leaves a group.

For instance, FIG. 19 is a diagram illustrating one example of a case that a prescribed one of a plurality of shot targets leaves a group. Referring to FIG. 19 (*a*), if a prescribed one of a plurality of shot targets gets away from another shot target, a small flying object can raise its flight altitude. However, as the distance between a prescribed one of a plurality of the shot targets and other shot targets further increases, if it is difficult for the small flying object to further raise its flight altitude, referring to FIG. 19 (*b*), the small flying object can shoot the rest of the shot targets except the shot target having left the corresponding group.

Moreover, the small flying object can send an information, which indicates that the shot target having left the group cannot be shot, to a mobile terminal. If so, referring to FIG. 19 (*c*), the controller 180 can control a message 1910, which indicates that the shot target having left the group cannot be shot any further, to be output.

Further, which side of a plurality of the shot targets will be shot can be determined in accordance with a priority or a group creator. For instance, according to the example shown in FIG. 19 (*b*), if a priority of A or B is higher than that of C having left a group of shot targets A, B and C, the small flying object can shoot A and B except C. Further, if the priority of C is higher than that of each of A and B, the small flying object may shoot C except A and B.

In another instance, if A is a group owner among A, B and C, the controller 180 can control A and B to be shot except C having left the corresponding group. Further, if C is a group owner, the controller 180 can control C to be shot except A and B. In another instance, as a distance between shot targets increases, of the shot targets are divided into a plurality of groups, the controller 180 can control a group, which includes more persons, to be shot. According to the example shown in FIG. 19 (*b*), A and B are included in a left group and C is included in the other group. Hence, the controller 180 can control the group including more persons (i.e., A and B) to be shot.

Figure 20:
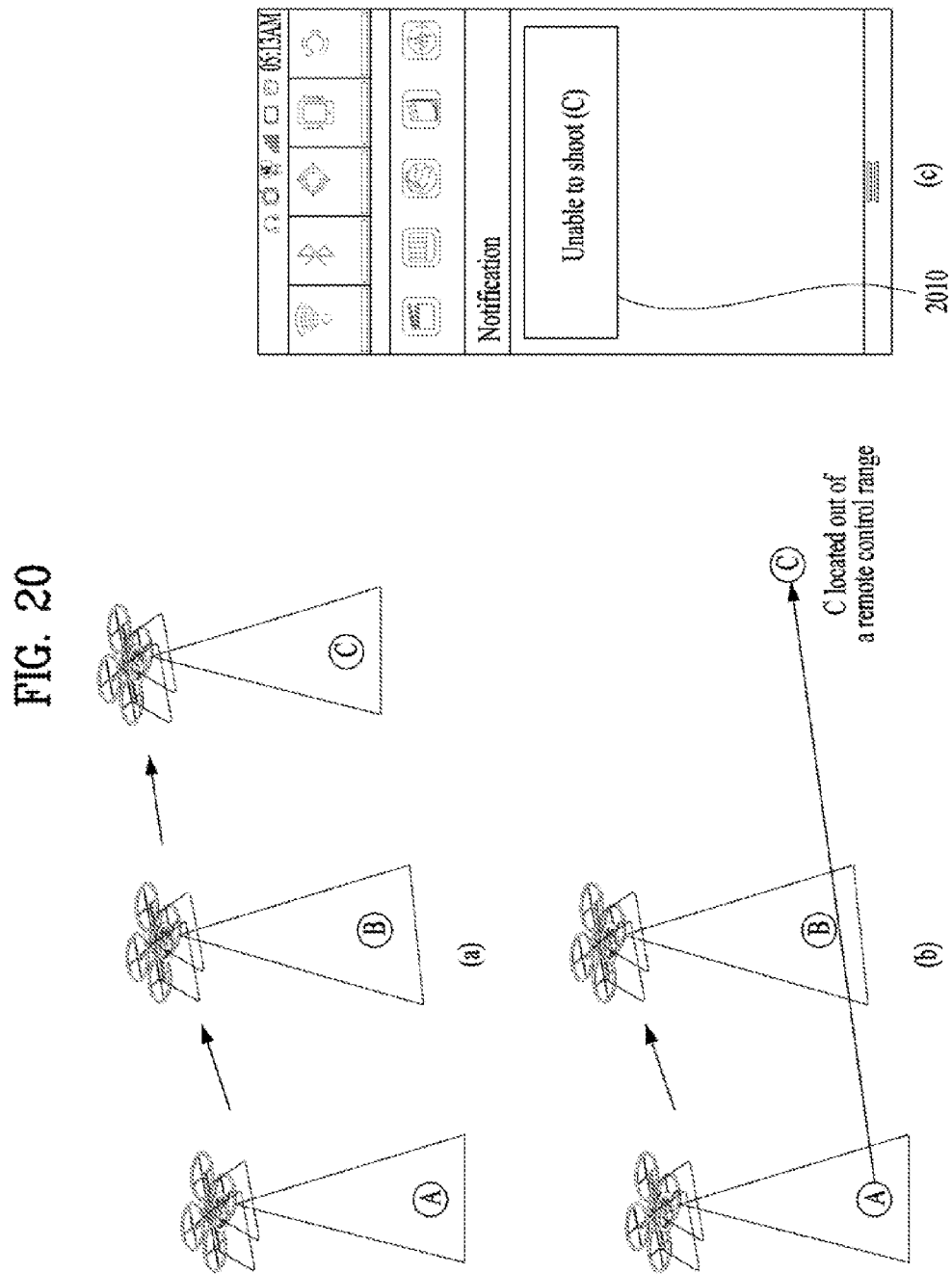
FIG. 20 is a diagram illustrating one example of a case that a prescribed one of shot targets is spaced apart from a group owner over a prescribed distance.

FIG. 20 is a diagram illustrating one example of a case that a prescribed one of shot targets is spaced apart from a group owner over a prescribed distance. When a small flying object is set to shoot shot targets in sequence, referring to FIG. 20 (*a*), the small flying object can sequentially shoot the respective shot targets in order of the settings. However, as a distance of a shot target intended to be shot is distant from a mobile terminal, if it is estimated that the small flying object will deviate from a remote control range of the mobile terminal, the small flying object can skip the shooting of the corresponding shot target.

For instance, referring to FIG. 20 (*b*), after A and B have been shot, although C is intended to be shot, if it is determined that C is spaced apart from A, who is an owner of the mobile terminal, over a prescribed distance, the small flying object can skip the shooting of C. While skipping the shooting of C, the small flying object can send an information, which indicates that the shooting of C cannot proceed, to the mobile terminal. If so, referring to FIG. 20 (*c*), the controller 180 can output a message 2010 indicating that the shooting of C is not available.

While a video is shot or recorded, if a shot target is in an emergency situation, a small flying object can send an information, which indicates that the shot target is in the emergency situation, to a mobile terminal. For instance, if a shot target tumbles or moves to a spot close to a cliff, the small flying object can send an information, which indicates that the shot target is in the emergency situation, to a mobile terminal. In another instance, if a stranger approaches a shot target, the small flying object can send an information, which indicates that the shot target is in danger, to a mobile terminal. If so, the controller 180 can output a message indicating that the shot target is in danger.

Once a shooting ends, a small flying object can send a shot video to a mobile terminal set as a group owner. As mentioned in the foregoing description with reference to FIG. 16, the small flying object can send the recorded video to the mobile terminal while returning to a preset location. If a shot image is received from a small flying object, the controller 180 can play or edit the received shot image. In case of editing the received shot image, the controller 180 can partition the shot image per type through an analysis of the shot image.

Figure 21:
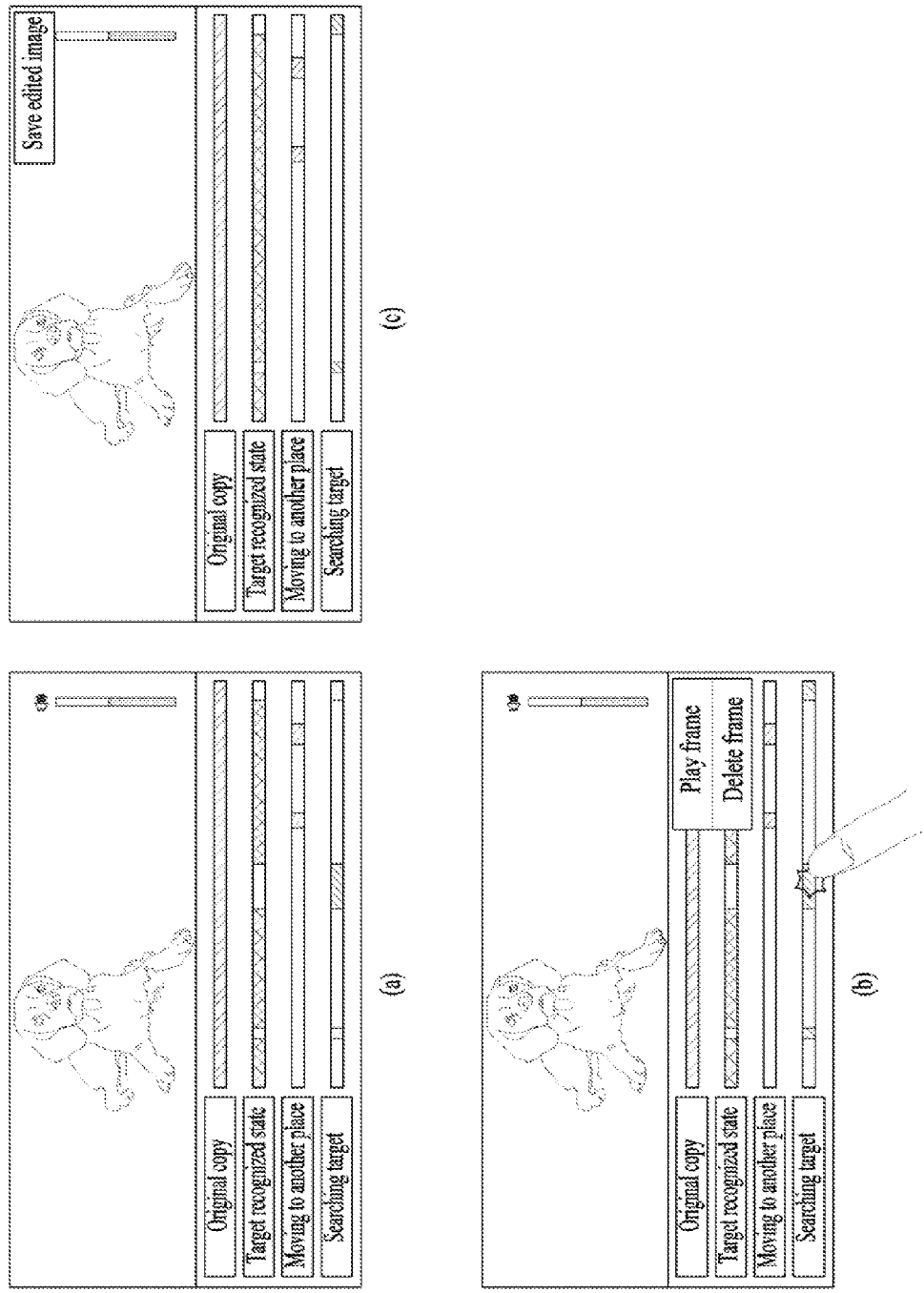
FIG. 21 is a diagram illustrating one example of partitioning a shot image per type.

For instance, FIG. 21 is a diagram illustrating one example of partitioning a shot image per type. Referring to FIG. 21, the controller 180 can control information on a quantity of shooting a shot target in a video, a quantity of shooting a shot target by a small flying object flying toward the shot target in the video and a quantity for the small flying object to detect a shot target in the video to be output. According to the example shown in FIG. 21 (*a*), the quantity of shooting the shot target, the quantity shot through a flight and the quantity shot to detect a shot target are output through different bars, respectively. Alternatively, the above-listed quantities may be displayed on a single bar by being differentiated in color.

Moreover, the quantity of shooting the shot target may be output on a different bar per shot target or may be output on a single bar by being differentiated in color. For instance, if a video of shooting shot targets A, B and C is made, a quantity of shooting A, a quantity of shooting B and a quantity of shooting C may be represented through different bars, respectively, or may be represented on a single bar by being differentiated in color.

If a user selects a specific interval, referring to FIG. 21 (b), the controller 180 can control a menu, which is provided to play or delete the selected interval, to be output. According to the example shown in FIG. 21 (b), if an item 'play frame' is selected, the controller 180 can play the interval selected by the user. For instance, referring to FIG. 21 (B), a partial interval, which is selected by a user, of a quantity shot by a flying object to detect a target may be played.

Referring to FIG. 21 (b), if an item 'delete frame' is selected, the controller 180 can delete a corresponding interval from a video. According to the example shown in FIG. 21 (c), a portion of an interval shot by user to detect a shot target is deleted. Like the example shown in FIG. 21, a user can edit a video by deleting an unnecessary interval.

In another instance, the controller 180 can edit a video by combining categories selected by a user. For instance, FIG. 22 is a diagram illustrating of performing a video editing. Referring to FIG. 22 (a), in case of attempting to edit a video, the controller 180 can control a selection menu, which is provided to select intervals to combine, to be output. In FIG. 22 (a), Tom, Jane, John and Unknown may mean the quantities shot by Tom, Jane, John and Unknown User, respectively. An item 'moving' may mean a quantity shot by a small flying object in the course of moving to shoot a shot target. An item 'scenery' may mean a quantity shot at an altitude of a small flying object over a prescribed height as a quantity of shooting scenery around a shot target. Group 1 may mean a quantity of shooting a shot target included in Group 1 together. Group 2 may mean a quantity of shooting a shot target included in Group 2 together. Group 3 may mean a quantity of shooting a shot target included in Group 3 together. An item 'all' may mean a quantity of shooting all shot targets together.

The controller 180 can edit a video by combining the quantities corresponding to the items selected from the selection menu shown in FIG. 22 (a). For instance, if the items 'Jane', 'moving', 'scenery' and 'all' are selected, referring to FIG. 22 (b), the controller 180 can create a video edited by combining a quantity of shooting Jane, a quantity shot by a small flying object in the course of moving, a quantity of shooting scenery, and a quantity of shooting all shot targets together.

Thereafter, the controller 180 can share the recorded or edited video with members of a corresponding shot group. For instance, FIG. 23 is a diagram illustrating one example of sharing a video. Referring to FIG. 23, if an item 'share shot image' is selected (FIG. 23 (a)), the controller 180 can control a menu, which is provided to select a member to share a video with from a shot group, to be output (FIG. 23 (b)). If the member to share the video with is selected, the controller 180 can send a video to a terminal of the selected member.

Besides, while a video is played, the currently played video may be shared with a group member as well. Meanwhile, the mobile terminal according to an embodiment of the present invention can be used to remotely control a flying object that delivers product. Thus, the mobile terminal receives a notification of a good purchase from an order management server. If a delivery of the product starts, the mobile terminal can receive a notification of a product delivery progress situation through a communication with a flying object that is in charge of the delivery.

FIG. 24 is a schematic diagram of a product receiving sequence according to an embodiment of the present invention. When a purchaser purchases a product through a website, the purchaser can input an identification information (e.g., a phone number of the mobile terminal) and a product receiving address (S1). If so, the order management server can send a message indicating that the product is normally purchased to the mobile terminal In this instance, the message may be sent in form of a text message such as SMS, LMS, MMS, or the like, or in form of a push message through an application. Since the product purchase or the transmission of the message according to the product purchase have been known to the public already, their details shall be omitted from the following description.

A seller ships the product on the flying object and can set a destination of the flying object to the delivery address input by the purchaser (S2). Moreover, if the seller inputs that the product has been delivered, the order management server can send a message indicating that the product has been sent to a mobile terminal of the purchaser. Moreover, if the purchaser requests an inquiry of a product delivery progress status, the order management server can output a delivery guide page that guides a product delivery status (S3).

Figure 25:
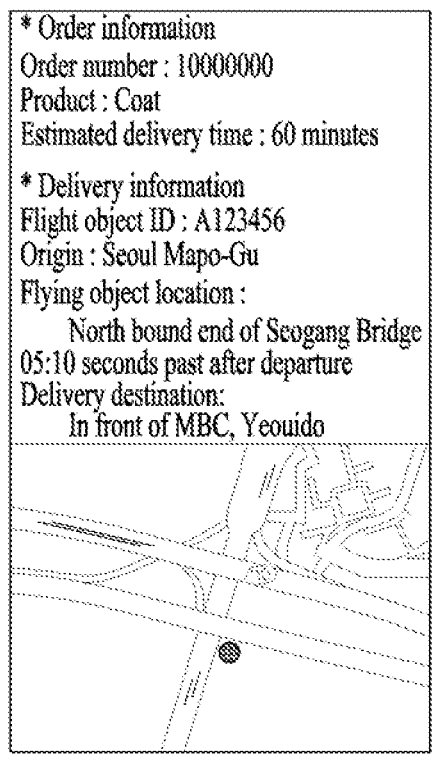
FIG. 25 is a diagram illustrating one example of outputting a delivery guide page.

For instance, FIG. 25 is a diagram illustrating one example of outputting a delivery guide page. On a product guide page, information such as a user's order identifier (e.g., an order number), an information on a product purchased by a user, an estimated time taken for a user purchased good to be delivered, a lapse of time since a delivery start, a location of a flying object, an identification information of a flying object, an origin (i.e., departure point) of a flying object, a destination of a flying object and the like can be output.

The order management server can send a message indicating the delivery status to the mobile terminal again at a timing point of an occurrence of a specific event. In this instance, the event may include one of a case that an estimated time of a product delivery completion is equal to or smaller than a prescribed time, a case that a flying object completes a delivery, a case that a flying object is unable to make a delivery (e.g., a case that it is impossible to make a delivery due to a bad weather, a case that it is unable to make a delivery due to a breakdown of a flying object, a breakage of a product on delivery, etc.) and the like.

In order for the purchaser to quickly access the delivery guide page, when the order management server sends the message indicating the product delivery status, an address (e.g., URL address, etc.) accessible to the delivery guide page can be included in the message.

While the delivery guide page is output, the purchaser may modify the delivery destination information. Once the delivery destination information is amended, the controller sends the modified delivery destination information to the order management server and the order management server can remotely adjust a delivery destination of the flying object.

Figure 26:
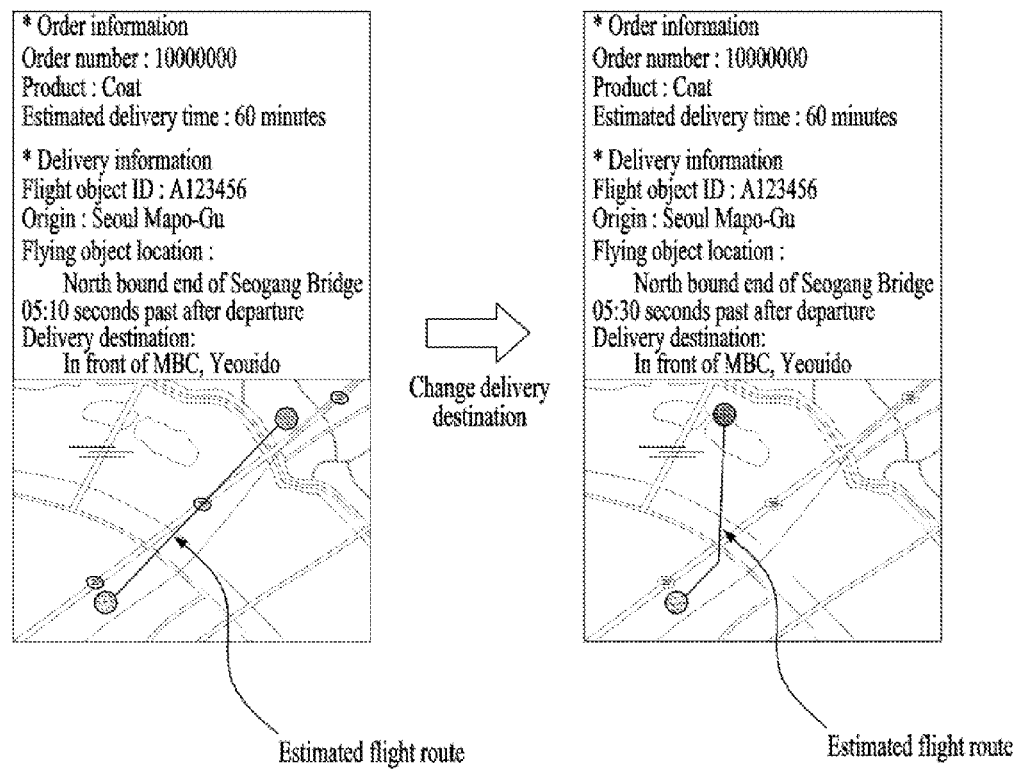
FIG. 26 is a diagram illustrating one example of changing a delivery destination.

For instance, FIG. 26 is a diagram illustrating one example of changing a delivery destination. While a delivery guide page is output, a purchaser can change a delivery destination. If so, the order management server can provide a flying object with an information on the changed delivery destination. If so, the flying object can alter a flight route toward the changed delivery destination. For instance, referring to FIG. 26 (a) and FIG. 26 (b), as a delivery destination is changed, an estimated flight route of a flying object is changed.

If the flying object approaches the destination in a prescribed distance, the mobile terminal can exchange information with the flying object (S3). In particular, the mobile terminal receives image data from the flying object and can then designate a location at which the flying object will land based on the received image data (S4). As the flying object has landed and the product is handed in, the product purchase and delivery process can be ended (S5).

In the following description, one example for a mobile terminal to perform a mutual interaction with a flying object is described in detail. First of all, a flying object in charge of a product delivery is a flight vehicle (e.g., an airplane, a helicopter, etc.) that can fly by radio waves without a person on board and may include one of a drone, a small helicopter and the like. A camera may be installed in the flying object in charge of the delivery. A mobile terminal can receive an image taken by the flying object through a communication with the flying object.

For clarity of the following description, assume that the mobile terminal according to an embodiment of the present invention may include at least one of the components shown in FIGS. 1A to 1C. For instance, assume that the mobile terminal according to an embodiment of the present invention includes the wireless communication unit 110, the display unit 151, the memory 170 and the controller 180.

In this instance, the wireless communication unit 110 may play a role in performing a wireless communication with the flying object. In particular, the controller 180 transmits a remote control signal to the flying object or receives data from a small flying object, through the wireless communication unit 110. Further, the mobile terminal and the small flying object can communicate with each other through a mobile communication network such as HSPDA, WCDMA, HSPA+, or the like. Furthermore, the mobile terminal and the flying object can communicate with each other through Bluetooth, Zigbee, Wi-Fi Direct, WLAN, and/or the like.

Moreover, assuming that the display unit 151 includes a touchscreen, the mobile terminal according to an embodiment of the present invention is described in detail as follows. However, it is not mandatory for the display unit 151 to include the touchscreen. If the display unit 151 does not include the touchscreen, touch inputs mentioned in the following description can be substituted with user inputs of other types (e.g., an action of pushing a physical button of the mobile terminal, a gesture input using the mobile terminal, etc.).

Figure 27:
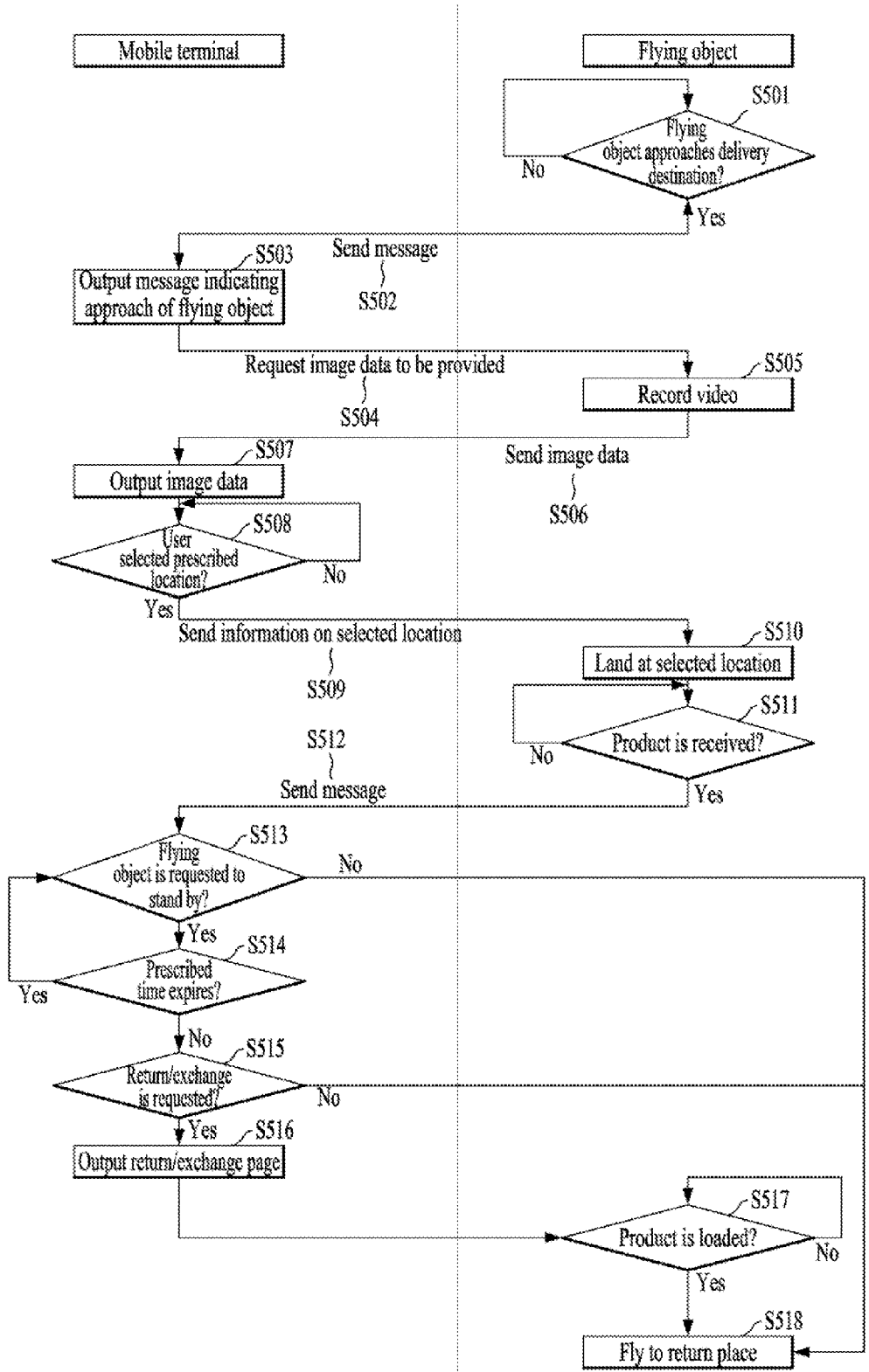
FIG. 27 is a flowchart of an operation to describe an associated operation between a mobile terminal according to an embodiment of the present invention and a flying object.

The mobile terminal according to an embodiment of the present invention is described in detail with reference to the accompanying drawings as follows. FIG. 27 is a flowchart of an operation to describe an associated operation between a mobile terminal according to an embodiment of the present invention and a flying object. For clarity of the description of the following embodiment, assume that a mobile terminal and a flying object directly communicate with each other. In this instance, the direct communication only means that data generated by the mobile terminal is sent by taking the flying object as a destination and that data generated by the flying object is sent by taking the mobile terminal as a destination. However, the direct communication may not mean that a transmission medium (e.g., a base station, a server, etc.) is unnecessary between the mobile terminal and the flying object. For example, the mobile terminal and the flying object can communicate directly with each other using LTE, HSPDA or the like via a base station or the like.

Moreover, the mobile terminal and the flying object may communicate with each other by a short range communication such as Bluetooth, Zigbee or the like. For example, if the flying object approaches the mobile terminal in a prescribed distance, the order management server can send a connection information including a Bluetooth ID (and a PIN code) of the flying object to the mobile terminal. If so, the mobile terminal is paired with the flying object through the received connection information and can then communicate with the flying object.

According to the embodiments mentioned in the following description, the mobile terminal and the flying object are assumed as communicating with each other in direct. Alternatively, the mobile terminal and the flying object may communicate with each other indirectly via a prescribed server (e.g., an order management server, etc.). For example, the flying object sends image data to the order management server, and the order management server may make a request for a transmission of image data to the order management server. In response to the request made by the mobile terminal, the order management server can send image data to the mobile terminal. In particular, the mobile terminal and the flying object can perform data transmissions and receptions via a prescribed server.

The mobile terminal according to an embodiment of the present invention is described in detail with reference to FIG. 27 as follows. First of all, if a flying object approaches in a prescribed distance from a delivery destination or a remaining time to an estimated delivery complete time becomes equal to or smaller than a prescribed time (S501), the flying object can send an information, which indicates that the flying object has entered a range in the prescribed distance from the delivery destination, to the mobile terminal (S502). If so, the mobile terminal can output a message indicating that the flying object has entered the range in the prescribed distance (S503).

For instance, FIG. 28 is a diagram illustrating one example of outputting a message through a mobile terminal. Referring to FIG. 28, if a flying object has entered a range in a prescribed distance, the controller 180 can control a message, which indicates that the flying object has approached, to be output. If the message is touched, referring to FIG. 28 (b), the controller 180 can control a popup window, which queries whether to check an image taken by the flying object, to be output.

If a user input for requesting to check the image taken by the flying object is received, the mobile terminal can make a request for providing image data to the flying object (S504). If so, the flying object starts to take images through a camera (S505) and can then provide the taken image data to the mobile terminal (S506).

Figure 29:
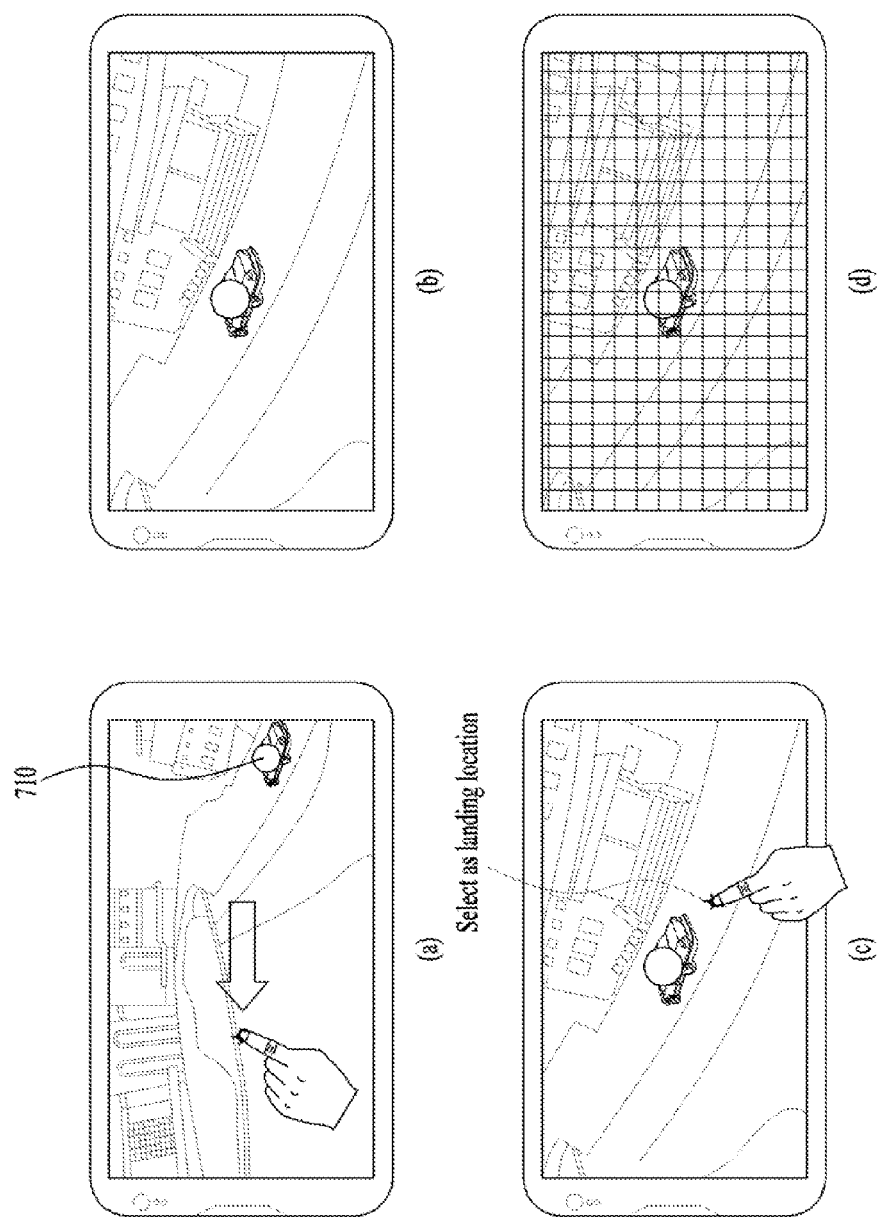
FIG. 29 is a diagram illustrating one example of designating a landing place of a flying object.

If the image data is received from the flying object, the user can designate a place at which the flying object will land from the image data (S507). For instance, FIG. 29 is a diagram illustrating one example of designating a landing place of a flying object. If the image data is received from the flying object, the controller 180 can output the received image data through the display unit 151. Through the output image data, the user can check the images taken by the flying object. However, a location desired to be designated as a landing place by the user can not be contained in the images taken by the flying object during the flight.

Hence, while the image data is output, if a drag input in a prescribed direction is received, the controller 180 can request the flying object to move or rotate the camera. For instance, referring to FIG. 29 (a), if a pointer is moved from right to left, the controller 180 can request the flying object to move the camera to the right side. Hence, as the camera of the flying object is moved to the right side, referring to FIG. 29 (b), the mobile terminal can receive an image having a right side taken further than the previous. Unlike the example shown in the drawing, a gesture input of moving the mobile terminal may be utilized as a user input for requesting the camera movement or rotation. For instance, a user input of rotating the mobile terminal clockwise may be provided to move the camera to the right side. And, a user input of rotating the mobile terminal counterclockwise may be provided to move the camera to the left side.

Moreover, the controller 180 can make a request for enlargement (zoom-in) or reduction (zoom-out) of the image to the flying object (not shown in the drawing). For instance, if a touch input (e.g., a pinch zoom-in input) of increasing a distance between two pointers currently touching the display unit 151 is received, the controller 180 can make a request for zoom-in to the flying object. On the contrary, if a touch input (e.g., a pinch zoom-out input) of decreasing a distance between two pointers currently touching the display unit 151 is received, the controller 180 can make a request for zoom-out to the flying object. In response to the request made by the mobile terminal, the flying object can perform zoom-in or zoom-out. Further, instead of adjusting a camera magnification power, the flying object can perform the zoom-in operation or the zoom-out operation by raising or lowering an a flight altitude.

Thereafter, referring to FIG. 29 (c), while the image data is output through the display unit 151, if a prescribed point is touched, the controller 180 can send the touched coordinates or a location information corresponding to the touched coordinates to the flying object. If so, the flying object recognizes a location corresponding to the touched coordinates or a location indicated by the received location information as a landing place and can then land at the selected place.

Further, in order for the user to precisely select the location, as shown in FIG. 29 (d), a grid can be displayed on the image data. if the user touches a prescribed point on the image data, the controller 180 can send coordinates of the grid corresponding to the selected location to the flying object. If so, the flying object may recognize the location corresponding to the touched grid as the flying object.

In order for the user to select the landing location more easily, a current location of the mobile terminal may be displayed on the image data output through the display unit 151. For example, referring to FIGS. 29 (a) to 29 (d), an indicator 710 indicating a current location of the mobile terminal is output. Besides, if a landing point of the flying object is selected, an indicator indicating the landing point of the flying object may be further output on the image data (not shown in the drawing).

After the flying object has recognized the location of the mobile terminal, the flying object sends a merged image data created from merging the indicator 710 and the image data together to the mobile terminal or may send the image data and a location information on a location at which the indicator 710 on the image data will be displayed to the mobile terminal.

In another example, after the mobile terminal has received the image data from the flying object, the mobile terminal may display a current location of the mobile terminal on the image data by itself. The flying object can check the location of the mobile terminal through the location information on a location at which the location information is received from the mobile terminal or the recognition of the mobile terminal in the image data (or the recognition of the user currently holding the mobile terminal).

However, when the flying object is making a night flight, it is difficult to recognize the mobile terminal (or the user currently holding the mobile terminal). Hence, for the further facilitation of the location check of the mobile terminal, the controller 180 can generate a light from a light emitting device (e.g., LED, infrared generator, etc.). Hence, the flying object can recognize a current location of the mobile terminal by looking at the light output from the mobile terminal.

Moreover, when the flying object makes a night flight, the flying object may provide the mobile terminal with an infrared image taken through an infrared imaging system. Hence, a user can check the image taken by the flying object more accurately at night. When a light identifiably by the flying object is output, the controller 180 can adjusts an output pattern of the light, thereby controlling the output pattern of the light to output an order identification information or a purchaser identification information. For instance, the controller 180 can control the output pattern of the light to have a binary code of the order identification information (e.g., an order number) or Morse code of the purchaser identification information (e.g., ID of the purchaser, etc.).

After the flying object has performed an analysis of the output pattern of the light of the mobile terminal, the flying object can confirm whether the mobile terminal currently outputting the light is a valid purchaser by comparing the analysis result with the order identification information or the purchaser identification information. When the mobile terminal currently outputting the light is the valid purchaser, the flying object can display the location of the corresponding mobile terminal on the image data.

In another instance, the mobile terminal may determine an output pattern of a light in accordance with a pattern requested by the flying object. For example, if the flying object makes a request for flickering a light in an interval of 1 second to the mobile terminal, the controller 180 can control the light to be flickered in the interval of 1 second. The flying object searches for the mobile terminal that flickers the light in the interval of 1 second and can then display a location of the corresponding mobile terminal on the image data.

According to the example shown in FIG. 29, a location selected by a user is set as a landing point of a flying object. Unlike the example shown in the drawing, the flying object may determine a landing point automatically through an image analysis. For example, as mentioned in the foregoing description of the example, if a mobile terminal currently outputting a light of a preset pattern in an image is detected, the flying object can determine a periphery of the mobile terminal as a landing point. In another example, the flying object can automatically determine a landing available space around a building indicated by a delivery destination address (e.g., a lot number address), a rooftop of a building or the like as a landing place.

Figure 30:
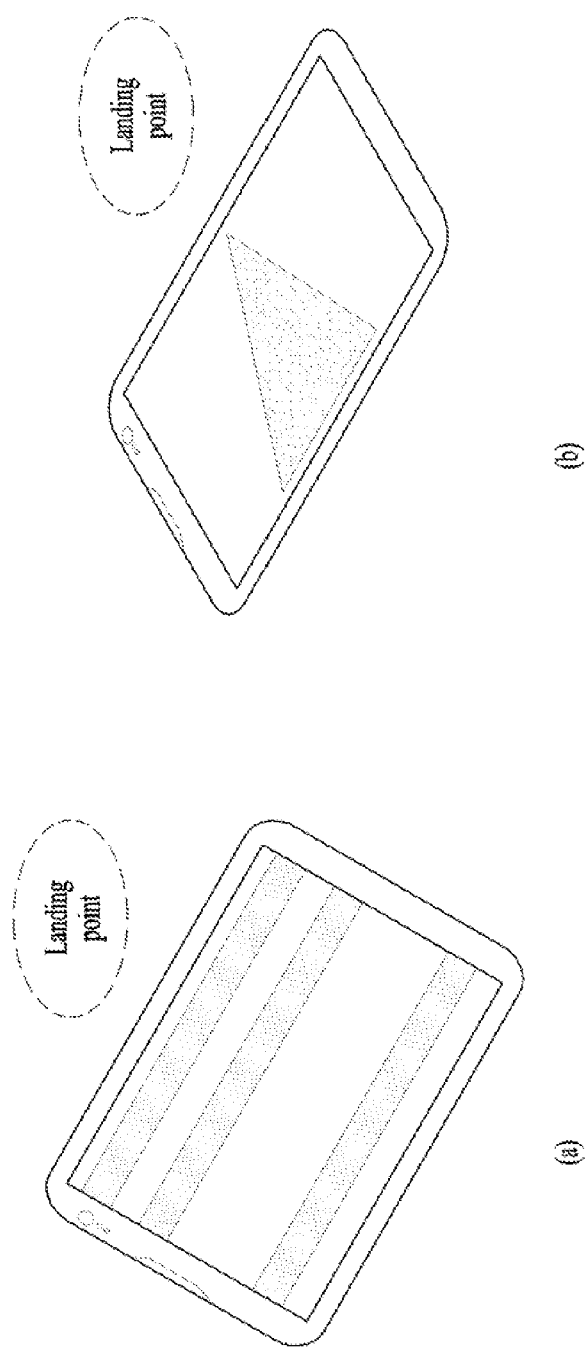
FIG. 30 is a diagram illustrating one example of outputting an image pattern.

Once the landing place of the flying object is selected, the controller 180 can control an image pattern for purchase information identification to be output through the display unit 151. For instance, FIG. 30 is a diagram illustrating one example of outputting an image pattern. Referring to FIG. 30 (a), the controller 180 can control an image pattern of a barcode type, in which lines in 2 colors are alternately arranged, to be output through the display unit 151. If so, the flying object can check the purchase information by decrypting the image pattern currently output through the display unit 151.

If the mobile terminal is determined as a valid purchaser through the purchase information check, the flying object can land at the designated place. Moreover, the controller 180 can control an information, which indicates that the purchase information has been checked, to be output. Referring to FIG. 30 (b), an image in a triangle shape is output to indicate that the purchase information has been checked. In this instance, as shown in FIG. 30 (b), a prescribed apex of the triangle may face a landing direction of the flying object.

The image pattern and the example of the image output shown in FIG. 30 (a) and FIG. 30 (b) are provided for clarity of the description only, by which the present invention is non-limited. Unlike the example shown in FIG. 30 (a), QR code or the like can be used as an image pattern and information (e.g., a message) different from the example shown in FIG. 30 (b) can be used to indicate that the purchase information check is completed.

If the flying object lands or a user receives the product delivered by the flying object (S511), the flying object can send an information, which indicates that the product was received, to the mobile terminal (S512). If so, the controller 180 can control a popup window, which is provided to determine whether to make the flying object return, to be output.

For instance, FIG. 31 is a diagram illustrating one example of outputting a popup window. Referring to FIG. 31 (a), if a message, which indicates that the flying object has landed or that the product handover is completed, is received from a flying object, the controller 180 can control a popup window, which is provided to select whether to make the flying object return or stand by, to be output.

If a user input for desiring to make the flying object return is input (S513), the controller 180 requests the flying object to return. And, the flying object can return to a pre-registered place. Although a user input is not received for a prescribed time since outputting the popup window, the flying object may return to the pre-registered place.

Further, if the user input for desiring to make the flying object standby is received (S513), the controller 180 can request the flying object to stand by for a prescribed time. If so, the flying object can stand by at the landing place for the prescribed time instead of returning to the pre-registered place.

If a prescribed expires (S514), the controller 180 can control the popup window, which is provided to query whether to make the flying object return, to be output again (S513). The user checks the product handed in by the flying object and can then determine whether to return (or take back) the product. If the user makes a request for returning or exchanging the product handed in to the user (S515), the controller 180 can output a return/exchange page for the product return of exchange (S516). According to the example shown in FIG. 31 (b), the return/exchange page is output.

If the user puts the product, which is to be returned, in the flying object (S517), the flying object can return to a pre-registered place (S518). Further, the flying object may check whether an object to be returned is put in the flying object by a weight comparison or an analysis of an image input through the camera.

The popup window, which is provided to determine whether to make the flying object return, shown in FIG. 31 may be implemented or skipped depending on a type of a delivered product. For instance, if a delivered product (e.g., clothes, etc.) is an object of which defects can be checked instantly, as shown in FIG. 31, the popup window for determining whether to make the flying object return is output. If a delivered product (e.g., food, etc.) is an object of which defects cannot be checked instantly, the output of the popup window shown in FIG. 31 can be skipped. When the output of the popup window is skipped, the flying object can return to a preset place right after handing in the product.

Further, the flying object can check whether the product is handed in to a user through a weight or image analysis. Alternatively, the flying object can determined that the product was handed in to the user if a prescribed time expires after landing. In another instance, in order to prevent the flying object from being extorted by a purchaser, a standby service of the flying object may be available only if the purchaser prepays a prescribed deposit money. If the flying object starts to make a flight to a return place normally, the deposit money can be refunded.

Moreover, in order to check whether a purchased product is handed in correctly, the flying object takes a photo of a person in charge of handing in the product and can then send the taken photo to a mobile terminal registered on giving an order. Hence, the purchaser can check whether the person in charge of handing in the product is a valid person.

The flying object can determine whether the flying object approaches in a prescribed distance around a delivered object through a location measurement using GPS, data received from a base station, or the like. In another example, the flying object may determine that the flying object almost arrives at a delivery destination by receiving a beacon signal broadcasted by an AP or a Bluetooth communication device registered on purchasing a product by a purchaser.

For instance, FIG. 32 is a diagram illustrating one example of recognizing that a flying object has approached a delivery destination. Referring to FIG. 32, if the flying object listens to a beacon broadcasted by an AP registered on purchasing a product by a purchaser (i.e., if the flying object enters a beacon listening area), the flying object can recognize that it has arrived at a place close to a delivery destination. Thus, the purchaser inputs an identification information of the AP on purchasing the product and the order management server can send the identification information of the AP registered by the purchaser to the flying object.

If a beacon signal is received from an AP that matches the identification information of the AP, the flying object can determine that it has arrived at the place around the destination place. In this instance, the identification information of the AP may include at least one of an SSID of the AP and an address (e.g., MAC address) of the AP, by which the present invention is non-limited.

In another example, the flying object may recognize that it has arrived at a place close to a delivery destination through a listening of a beacon signal broadcasted by a Bluetooth communication device previously registered by a purchaser. Thus, the purchaser inputs an identification information of the Bluetooth communication device on purchasing a product and the order management server can send the identification information input by the purchaser to the flying object.

If the flying object receives a beacon signal from a device that matches the identification information of the Bluetooth communication device, the flying object can determine that it has arrived at the place close to the delivery destination. In this instance, the identification information of the mobile terminal or the Bluetooth communication device may include at least one of a device name (e.g., a name of a device used for Bluetooth communication) and an address (e.g., MAC address) of the device, by which the present invention is non-limited.

In this instance, the Bluetooth communication device may include one of various devices (e.g., TV, audio system, headset, Bluetooth dongle, etc.) capable of Bluetooth communications as well as the mobile terminal according to an embodiment of the present invention.

The mobile terminal may receive flight information of the flying object through a communication with the order management server or the flying object. If so, the mobile terminal can output a map for displaying a flight status of the flying object. For instance, FIG. 33 is a diagram illustrating one example of outputting a map for displaying a flight status of a flying object. Referring to FIG. 33 (a) and FIG. 33 (b), at least one of a departure location 1110 of the flying object, a delivery destination 1120, a current location 1130 of the flying object and a flight route 1140 of the flying object can be displayed on a map. Moreover, the controller 180 can display a total delivery time, a remaining delivery time 1150 and the like.

While the flying object delivers a product, a purchaser may cancel the product purchase. When the purchaser cancels the product purchase, the order management server may control the flying object to return to a pre-registered place. Further, the order management server may charge a cancellation fee for the order cancellation in accordance with a flight distance of the flying object.

For example, after the flying object has made a flight over a prescribed distance or time, if a user cancels the product order, a handling fee according to the order cancellation is charged. After the flying object has made a flight under the prescribed distance or time, if the user cancels the product order, the order can be cancelled without charging a handling fee. If a handling fee information is received from the order management server, the controller 180 can control the handling fee information 1150 according to the order cancellation to be output through the display unit 151.

According to the example shown in FIG. 33 (a), as a flight distance of the flying object is short, the order can be cancelled without a handling fee. According to the example shown in FIG. 33 (b), as the flying object has made a flight over a prescribed distance or time, the order can be cancelled only if a handling fee is paid.

A user can set up a flight route of the flying object. In particular, if the order management server sends a plurality of flight route information, the user can select a flight route of the flying object by selecting a prescribed one of a plurality of the flight route information. For instance, FIG. 34 is a diagram illustrating one example of selecting a flight route of a flying object. Referring to FIG. 34 (a), initially, a flight route of the flying object is set to a straight route connecting an origin to a delivery destination. However, when a dangerous area exists on the corresponding flight route, the controller 180 indicates a presence of the dangerous area on the corresponding flight route and can control a button, which is provided to change a flight route (or course), to be output.

For example, if a delivery route change button shown in FIG. 34 (a) is touched, referring to FIG. 34 (b), the controller 180 can control a menu, which is provided to select a delivery route of the flying object, to be output. According to the example shown in FIG. 34 (b), total 3 delivery routes exist. The controller 180 can output information on a time taken for a delivery on each of the flight routes.

If the mobile terminal provides the information on the flight route selected by the user, the order management server can remotely control the flying object to make a flight along the flight route selected by the user. According to the example described with reference to FIG. 34, the dangerous area may include at least one of an area having a flying object crash history, a high building existing area, an area having a history of a stolen flying object, a flight prohibited area, and the like.

The controller 180 displays a dangerous area on a flight route and can also display a dangerous area information in response to a request made by a user. For example, if a dangerous area information item is selected (FIG. 34 (a)), the controller 180 can control information on the dangerous area to be output (FIG. 34 (c)).

If a dangerous object is detected during a flight of the flying object, the flying object spontaneously changes a flight route or course and can send an information, which indicates that the flight route or course has been changed, to the mobile terminal. If so, the mobile terminal can output a message indicating that the flight route or course of the flying object has been changed and an information on the changed flight route or course.

Figure 35:
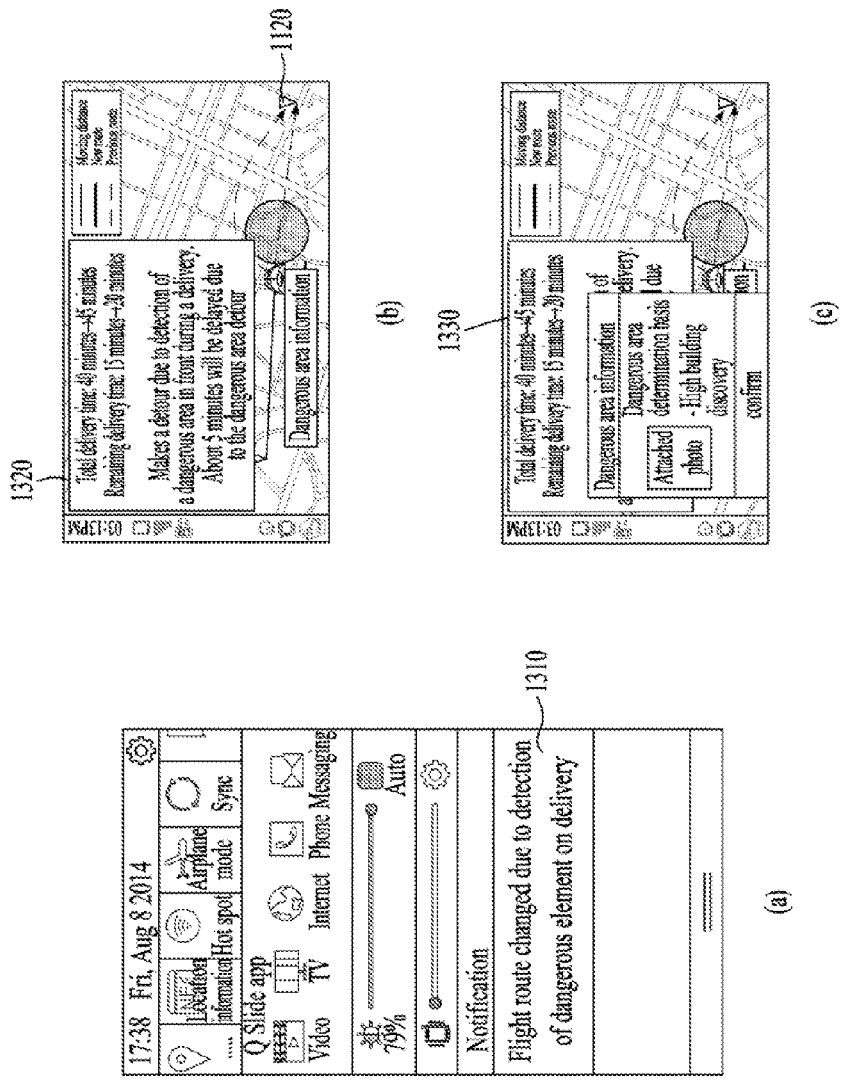
FIG. 35 is a diagram illustrating one example of changing a flight route of a flying object during a flight.

For instance, FIG. 35 is a diagram illustrating one example of changing a flight route (or course) of a flying object during a flight. Referring to FIG. 35, if the flying object discovers a dangerous element (e.g., a high building) during a flight, the flying object can change a flight route (or course). If so, the flying object can send an information, which indicates that the flight route has been changed, to the mobile terminal. If so, referring to FIG. 35 (a), the mobile terminal can control a message, which indicates that the flight route has been changed, to be output.

If the message 1310 is touched, as shown in FIG. 35 (b), the controller 180 can control an information on the changed flight route to be output. Further, the controller 180 can display an information 1320 on a delivery time increasing/decreasing due to the changed flight route. According to the example shown in FIG. 35 (b), as the flight route is changed, the delivery time is incremented by 5 minutes.

Moreover, the controller 180 displays the discovered dangerous area and can also display a dangerous area information. For example, if a dangerous area information item is selected (FIG. 35 (b)), the controller 180 can control an information 1330 on the corresponding area to be output (FIG. 35 (c)).

Although a landing place of the flying object is selected, if a dangerous element is detected from a periphery of the landing place, the flying object can send an information indicating that the dangerous element is discovered to the mobile terminal. If so, the controller 180 outputs a message indicating that the dangerous element has been discovered and can control a popup window, which is provided to select whether to change the landing place, to be output.

Figure 36:
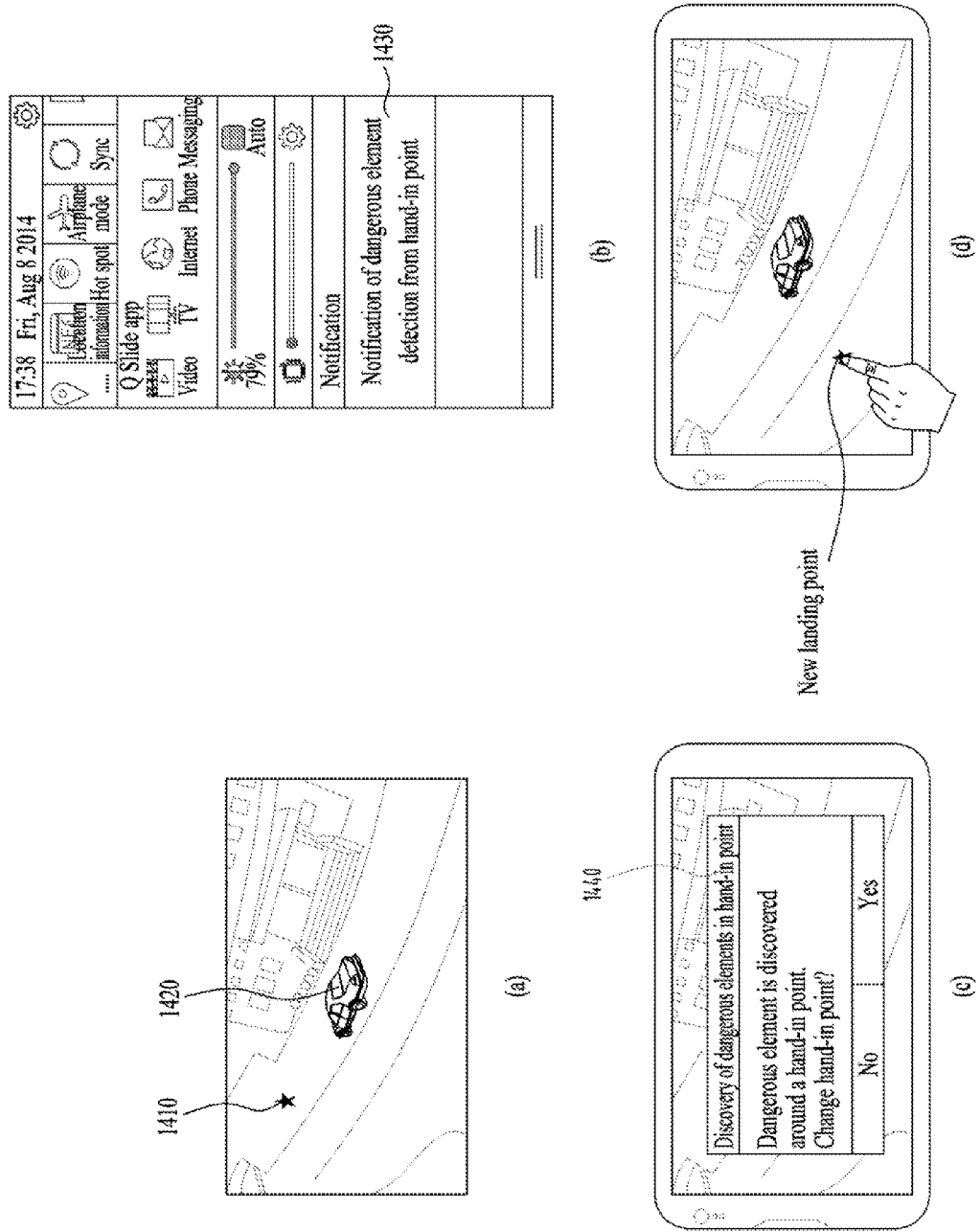
FIG. 36 is a diagram illustrating one example to describe an operation of a mobile terminal in case of detecting a dangerous object around a landing place.

For instance, FIG. 36 is a diagram illustrating one example to describe an operation of a mobile terminal in case of detecting a dangerous object around a landing place. Referring to FIG. 36, as a moving object exists around a landing point, if it is determined that landing at the selected landing place is not appropriate, the flying object can send an information, which indicates that a dangerous element has been discovered around the landing place, to the mobile terminal.

For example, referring to FIG. 36 (a), if a car 1420 currently driving toward a landing place 1410 is discovered, the flying object can recognize that a dangerous object exists around the landing place 1410. Having received the information indicating the presence of the dangerous object from the flying object, referring to FIG. 36 (b), the mobile terminal can output a message indicating that the dangerous element has been discovered around the landing point. If the message is touched, referring to FIG. 36 (c), the controller 180 can control a popup window, which queries whether to change a landing point, to be output.

If a user input for desiring to change the landing point is received through the popup window, the user can reselect a landing point on an image data currently output through the display unit 151. If the landing point is reselected, the flying object can land at the reselected landing point.

Figure 37:
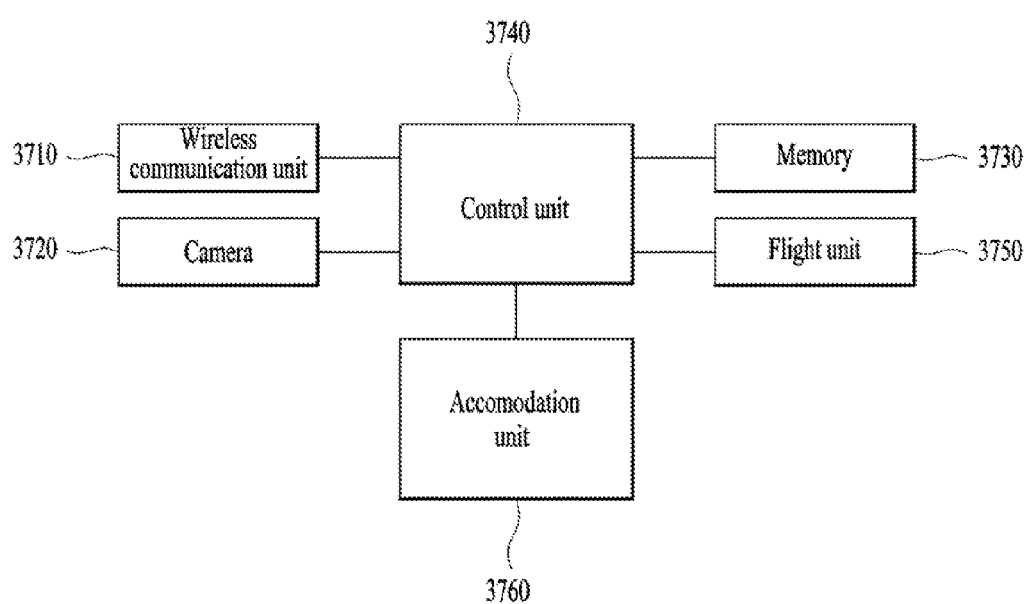
FIG. 37 is a block diagram of a small flying object according to an embodiment of the present invention.

FIG. 37 is a block diagram of a small flying object according to an embodiment of the present invention. Referring to FIG. 37, a small flying object may include a wireless communication unit 3710, a camera 3720, a memory 3730, a control unit 3740, a flight unit 3750 and an accommodation unit 3760.

The wireless communication unit 3710 can communicate with a mobile terminal. For instance, the wireless communication unit 3710 can communicate with the mobile terminal using such a communication technology as Bluetooth, Zigbee, Wi-Fi or the like or such a mobile communication technology as LET, HSPDA or the like. Besides, the wireless communication 3710 may be used to receive a location information of a small flying object. The control unit 3740 can move near a shot target or track the shot target, based on a location of the small flying object and a location of a terminal that becomes the shot target. In addition, the controller 3740 can check whether the flying object has arrived around a delivery destination based on a location of the small flying object.

The camera 3720 plays a role in shooting a video or a photo. A preview image prior to shooting a video or photo may be sent by wireless to a mobile terminal having a group owner position. Alternatively, the video or photo taken through the camera 1520 can be sent to a mobile terminal registered on giving an order.

The memory 3730 plays roles in storing a shot image data and data received from a mobile terminal. The control unit 3740 processes a remote control signal received from a mobile terminal and can also process an image input through the camera 3720. In particular, the control unit 3740 may detect whether a specific gesture is input or track a prescribed person, through the image processing. Alternatively, the controller 3740 processes a remote control signal received from the mobile terminal or the order management server and plays a role in setting a flight route (or course) according to a signal received from the mobile terminal or the order management server. Once the flight route (or course) is set, the controller 3740 can control the flying object to make a flight along the set flight route or course.

The flight unit 3750 enables the small flying object to fly. The flight unit 3750 may be controlled in response to a control command from the control unit 3740. And, the control unit 3740 can create a control command based on a remote control command from a mobile terminal. An accommodating unit 3760 plays a role in accommodating a product that is to be delivered to a purchaser. The accommodating unit 3760 may be substituted with a robot arm configured to hold or lift the product. Besides, at least one sensor (e.g., a weight sensor, a proximity sensor, etc.) configured to sense whether a product is put in the accommodating unit 3760 may be disposed around the accommodating unit 3760. Based on sensing signals of the sensors, the controller 3740 can determine whether a product is put in the accommodating unit 3760.

Accordingly, embodiments of the present invention provide various effects and/or features. According to at least one of embodiments of the present invention, a mobile terminal and controlling method thereof are provided, thereby enhancing user's convenience. According to at least one of embodiments of the present invention, a mobile terminal and controlling method thereof are provided, thereby remotely controlling a small flying object equipped with a camera.

It will be appreciated by those skilled in the art that the present invention can be specified into other form(s) without departing from the spirit or scope of the inventions. In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a display unit;
   a wireless communication unit configured to wirelessly communicate with a flying object; and
   a controller configured to:
   receive an input for setting at least one member of a created group of members to be a target,
   remotely control the flying object to obtain an image of the at least one member set as the target,
   display the image received from the flying object as a preview image on the display unit, and
   determine whether to set a person in the preview image as the target based on a preset gesture that the person makes in the preview image.

2. The mobile terminal of claim 1, wherein the controller is further configured to transmit at least one of location information of the target and face information of the target to the flying object via the wireless communication unit for the flying object to track the target.

3. The mobile terminal of claim 1, wherein the input includes setting a plurality of members in the group as targets, and
   wherein the controller is further configured to remotely control the flying object to capture each of the plurality of the targets in sequence.

4. The mobile terminal of claim 3, wherein the controller is further configured to determine a capture order based on a priority of each the plurality of targets.

5. The mobile terminal of claim 3, wherein the controller is further configured to control the flying object to capture the plurality of targets based on quantities assigned to the plurality of targets, respectively.

6. The mobile terminal of claim 1, wherein the input for setting the at least one member as the target corresponds to selecting an object in the preview image.

7. The mobile terminal of claim 1, wherein the controller is further configured to control the flying object to move to a previously registered return place after obtaining the image.

8. The mobile terminal of claim 7, wherein the controller is further configured to display a notification message on the display unit in response to a remaining battery level of the flying object being equal to or lower than a level required for returning the flying object to the return place.

9. The mobile terminal of claim 1, wherein the controller is further configured to:
   display a map for setting a return place of the flying object on the display unit, and
   set a selected location as the return place.

10. The mobile terminal of claim 9, wherein the controller is further configured to display a fly zone of the flying object on the map, and
wherein the fly zone is determined based on a remaining battery level of the flying object.

11. The mobile terminal of claim 1, wherein the controller is further configured to adjust a flight trace of the flying object based on a selected shot mode.

12. The mobile terminal of claim 1, wherein the controller is further configured to output a notification in response to the flying object being spaced apart from the mobile terminal over a prescribed distance.

13. The mobile terminal of claim 1, wherein the controller is further configured to skip obtaining the image of the target in response to the target being spaced apart from the mobile terminal over a prescribed distance.

14. The mobile terminal of claim 1, wherein the controller is further configured to control the flying object to capture either a first target in the group who has left the group or other targets of the group.

15. A method of controlling a mobile terminal, the method comprising:
wirelessly communicating, via a wireless communication unit of the mobile terminal, with a flying object;
receiving, via a controller of the mobile terminal, an input for setting at least one member of a created group of members to be a target;
remotely controlling, via the controller, the flying object to obtain an image of the at least one member set as the target;
displaying, via the display unit, the image received from the flying object as a preview image; and
determining, via the controller, whether to set a person in the preview image as the target based on a preset gesture that the person makes in the preview image.

16. The method of claim 15, further comprising:
transmitting at least one of location information of the target and face information of the target to the flying object via the wireless communication unit for the flying object to track the target.

17. The method of claim 15, wherein the input includes setting a plurality of members in the group targets, and
wherein the method further comprises remotely controlling the flying object to shoot each of the plurality of the targets in sequence.

18. The method of claim 17, further comprising:
performing a shooting order based on a priority of each the plurality of targets.

19. The mobile terminal of claim 1, wherein the controller is further configured to:
set a plurality of persons making the preset gesture in the preview image as the target, and
capture each of the plurality of persons in sequence.

* * * * *